US009942363B2

(12) United States Patent
Stevens et al.

(10) Patent No.: US 9,942,363 B2
(45) Date of Patent: *Apr. 10, 2018

(54) SCALABLE CONTENT DELIVERY NETWORK REQUEST HANDLING MECHANISM TO SUPPORT A REQUEST PROCESSING LAYER

(71) Applicant: Akamai Technologies, Inc., Cambridge, MA (US)

(72) Inventors: Matthew J. Stevens, Lexington, MS (US); Frederick R. Shotton, Piedmont, CA (US); Tong Chen, Brookline, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/341,850

(22) Filed: Nov. 2, 2016

(65) Prior Publication Data

US 2017/0078453 A1 Mar. 16, 2017

Related U.S. Application Data

(63) Continuation of application No. 14/135,179, filed on Dec. 19, 2013, now Pat. No. 9,509,804.

(Continued)

(51) Int. Cl.
*H04L 29/06* (2006.01)
*H04L 29/08* (2006.01)
*H04L 12/24* (2006.01)

(52) U.S. Cl.
CPC ............ *H04L 67/42* (2013.01); *H04L 41/509* (2013.01); *H04L 41/5051* (2013.01);
(Continued)

(58) Field of Classification Search
CPC . H04L 67/42; H04L 41/0803; H04L 41/5051; H04L 67/322; H04L 67/02; H04L 67/2814; H04L 41/509
See application file for complete search history.

(56) References Cited

U.S. PATENT DOCUMENTS 7,240,100 B1 * 7/2007 Wein ................... H04L 67/1008
709/214
7,373,416 B2 5/2008 Kagan et al.
(Continued)

OTHER PUBLICATIONS

Non-Final Office Action, U.S. Appl. No. 14/135,172, dated Dec. 9, 2016, 25 pages.
(Continued)

*Primary Examiner* — Gregory Todd
*Assistant Examiner* — Tania Pena-Santana

(57) ABSTRACT

Described herein are improved systems, methods, and devices for delivering and managing metadata in a distributed computing platform such as a content delivery network (CDN) so as to configure content servers to handle client requests. The teachings hereof provide, among other things, scalable and configurable solutions for delivering and managing metadata, preferably by leveraging dynamically obtained control information. For example, in one embodiment, a given content server may store metadata, e.g., in a configuration file, that references dynamic, late-bound control information for use in satisfying dependencies. This dynamic control information can be requested by the CDN content server, typically from a remote host, when needed to parse and execute the metadata.

14 Claims, 14 Drawing Sheets

Related U.S. Application Data

(60) Provisional application No. 61/740,598, filed on Dec. 21, 2012, provisional application No. 61/740,627, filed on Dec. 21, 2012, provisional application No. 61/827,398, filed on May 24, 2013, provisional application No. 61/841,822, filed on Jul. 1, 2013, provisional application No. 61/884,756, filed on Sep. 30, 2013.

(52) U.S. Cl.
CPC .............. *H04L 63/08* (2013.01); *H04L 67/02* (2013.01); *H04L 67/2814* (2013.01); *H04L 67/322* (2013.01)

(56) References Cited

U.S. PATENT DOCUMENTS

| | | | |
|---|---|---|---|
| 8,225,377 B2 | 7/2012 | Maffione et al. | |
| 2008/0126547 A1* | 5/2008 | Waldspurger | G06F 9/4881 709/226 |
| 2009/0132640 A1* | 5/2009 | Verma | G06F 17/30864 709/203 |
| 2009/0288163 A1 | 11/2009 | Jacobson et al. | |
| 2009/0327303 A1* | 12/2009 | Ootjers | H04L 67/1097 |
| 2010/0088505 A1* | 4/2010 | Coppola | H04L 63/0428 713/153 |
| 2012/0209942 A1* | 8/2012 | Zehavi | H04L 29/08729 709/213 |
| 2012/0317655 A1 | 12/2012 | Zhang et al. | |
| 2014/0181187 A1 | 6/2014 | Stevens et al. | |
| 2015/0088972 A1* | 3/2015 | Brand | H04L 45/126 709/203 |
| 2015/0089075 A1* | 3/2015 | Strigeus | G06F 17/30321 709/231 |
| 2015/0356580 A1* | 12/2015 | Kobayashi | G06Q 30/0203 705/7.32 |

OTHER PUBLICATIONS

U.S. Appl. No. 14/135,148.
U.S. Appl. No. 14/135,158.
U.S. Appl. No. 14/135,179.
U.S. Appl. No. 14/135,172.
U.S. Appl. No. 15/483,805.
U.S. Appl. No. 15/473,279.
Chinese Application No. 201380073436.7, 1st Office Action dated Nov. 3, 2017, translation attached, 40 pages.

* cited by examiner

SCALABLE CONTENT DELIVERY NETWORK REQUEST HANDLING MECHANISM TO SUPPORT A REQUEST PROCESSING LAYER

CROSS REFERENCE TO RELATED APPLICATIONS

This application is a continuation of U.S. application Ser. No. 14/135,179, filed on Dec. 19, 2013 which claims the benefit of priority of U.S. Application No. 61/740,598, filed Dec. 21, 2012, and of U.S. Application No. 61/740,627, filed Dec. 21, 2012, and of U.S. Application No. 61/827,398, filed May 24, 2013, and of U.S. Application No. 61/841,822, filed Jul. 1, 2013, and of U.S. Application No. 61/884,756, filed Sep. 30, 2013. The contents of the each of the foregoing applications are hereby incorporated by reference in their entireties.

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

Technical Field

This application relates generally to distributed data processing systems and to the delivery of content over computer networks.

Brief Description of the Related Art

Distributed computer systems are known in the art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. The CDN represents an infrastructure shared by multiple third parties, sometimes referred to as multi-tenant infrastructure. Typically, "content delivery" refers to the storage, caching, or transmission of content—such as web pages, streaming media and applications—on behalf of content providers, and ancillary technologies used therewith including, without limitation, DNS query handling, provisioning, data monitoring and reporting, content targeting, personalization, and business intelligence.

In a known system such as that shown in FIG. 1, a distributed computer system 100 is configured as a content delivery network (CDN) and is assumed to have a set of machines distributed around the Internet. Typically, most of the machines are configured as CDN content servers 102. Such machines may be located near the edge of the Internet, i.e., at or adjacent end user access networks. A network operations command center (NOCC) 104 may be used to administer and manage operations of the various machines in the system. Third party sites affiliated with content providers, such as web site hosted at origin server 106, offload delivery of content (e.g., HTML, embedded page objects, streaming media, software downloads, and the like) to the distributed computer system 100 and, in particular, to the servers 102 (which are sometimes referred to as "edge" servers in light of the possibility that they are near an "edge" of the Internet). Such servers 102 may be grouped together into a point of presence (POP) 107.

Typically, content providers offload their content delivery by aliasing (e.g., by a DNS CNAME) given content provider domains or sub-domains to domains that are managed by the service provider's authoritative domain name service. End user client machines 122 that desire such content may be directed to the distributed computer system to obtain that content more reliably and efficiently. The CDN servers 102 respond to the client requests, for example by obtaining requested content from a local cache, from another CDN server 102, from the origin server 106, or other source.

Although not shown in detail in FIG. 1, the distributed computer system may also include other infrastructure, such as a distributed data collection system 108 that collects usage and other data from the content servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a domain name system (DNS) query handling mechanism 115, which is authoritative for content domains being managed by the CDN. A distributed data transport mechanism 120 may be used to distribute control information (e.g., metadata to manage content, to facilitate load balancing, and the like) to the servers 102.

As illustrated in FIG. 2, a given machine 200 in the CDN (e.g., a given CDN server 102) comprises commodity hardware (e.g., an Intel processor) 202 running an operating system kernel (such as Linux® or variant) 204 that supports one or more applications 206. To facilitate content delivery services, for example, given machines typically run a set of applications, such as an HTTP proxy server 207, a name server 208, a local monitoring process 210, a distributed data collection process 212, and the like. The HTTP proxy 207 (sometimes referred to herein as a global host or "ghost") typically includes a manager process for managing a cache and delivery of content from the machine. For streaming media, the machine typically includes one or more media servers, such as a Windows® Media Server (WMS) or Flash® server, as required by the supported media formats.

The machine shown in FIG. 2 may be configured to provide one or more extended content delivery features, preferably on a domain-specific, content-provider-specific basis, preferably using configuration files that are distributed to the CDN servers 102 using a configuration system. A given configuration file preferably is extensible markup language (XML)-based and includes a set of content handling rules and directives that facilitate one or more advanced content handling features. The configuration file may be delivered to a CDN server 102 via the data transport mechanism 120. U.S. Pat. No. 7,240,100, the contents of which are hereby incorporated by reference, illustrate a useful infrastructure for delivering and managing CDN server content control information and this and other content server control information (referred to as "metadata") can be provisioned by the CDN service provider itself, or (via an extranet or the like) the content provider customer who operates the origin server 106.

The contents of U.S. Pat. No. 7,111,057, titled "Method and system for purging content from a content delivery network," are hereby incorporated by reference.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client browser then makes a content request (e.g., via HTTP or HTTPS) to a CDN server associated with the IP address. The request includes a host header that includes the original content provider domain or sub-domain. Upon receipt of the request with the host header, the server checks its configuration file to determine whether the content domain or sub-domain requested is actually being handled by the CDN. If so, the server applies its content handling rules and directives for that domain or sub-domain as specified in the configuration. As noted above, these content handling rules and directives may be located within an XML-based "metadata" configuration file.

As an overlay, the CDN resources may be used to facilitate wide area network (WAN) acceleration services between enterprise data centers (which may be privately managed) and third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the Internet 'cloud' (e.g., from a SaaS provider). To accomplish these two use cases, CDN software may execute on machines (potentially virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the service provider's other infrastructure (e.g., network and operations facilities). This type of managed solution provides an enterprise with the opportunity to take advantage of CDN technologies with respect to their company's intranet. This kind of solution extends acceleration for the enterprise to applications served anywhere on the Internet, such as SaaS (Software-As-A-Service) applications. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

As noted above, when a given content server in a CDN (or in another distributed computing platform) receives a content request, it typically needs to have information about the identity and characteristics of the requested objects, as well as information about the features of the CDN that should be invoked when delivering those objects. In short, the CDN (and by extension its constituent servers) needs to have information about how to handle a content request. Such information, referred to as "metadata," can be distributed in configuration files to the content servers, as noted above with respect to U.S. Pat. No. 7,240,100.

However, as a CDN grows and its feature set diversifies, the volume and complexity of metadata rises significantly. Moreover, the continuing move to cloud providers, platform as a service (PaaS), infrastructure as a service (IaaS), and/or software as a service (SaaS), further complicates the management of metadata for a CDN. Improved approaches for delivering and managing metadata are necessary to meet such challenges.

SUMMARY

Described herein are improved methods, devices, and systems for delivering and managing metadata in a distributed computing platform such as a content delivery network (CDN). The teachings hereof provide, among other things, scalable and configurable solutions for delivering and managing metadata, preferably by leveraging dynamically obtained control information. For example, in one embodiment, a given CDN content server may receive and store metadata (e.g., in a configuration file). The metadata can contain references to dynamic, late-bound control information for use in satisfying dependencies in the metadata. This dynamic control information is preferably requested by the CDN content server when needed to parse and execute the metadata, and in many cases (though without limitation) from a remote host at the time of the client request for an object. The dynamic control information may be parameters, e.g., an input to a function in the metadata configuration file. The dynamic control information may be functions or logic. In this way the dynamic control information represents a layer of abstraction within the metadata configuration file. The injected dynamic control information is well-suited for, among other things, information that is desired to be highly dynamic, more easily changeable or rotatable, and/or of high cardinality. The retrieved dynamic control information may be cached locally for use in handling to subsequent requests. A variety of further details, uses and alternatives are described in this document.

By way of further illustration, in an embodiment, an apparatus can comprise a first server comprising circuitry forming one or more processors coupled to memory holding non-transitory computer-program instructions. The execution of the instructions can cause the first server to receive a request (e.g., a request for service accessible via an API) from a client device over a network interface, and identify a content control that indicates how to handle the request from within a set of content controls stored at the first server, wherein the content control comprises any of: request validation, client authentication, and client authorization. The content control can have at least one dependency on particular control information. The first server further can send a request to a remote host for the particular control information, receive the particular control information from the remote host, satisfy the at least one dependency with the particular control information, and apply the content control to the request. After applying the content control, the first server can send at least a portion of the client device request to a second server, which can be a server that provides the requested service accessible via the API.

In certain embodiments, the request is directed to universal resource locator (URL) that represents an API endpoint, the URL comprising any of a hostname and a path. The particular control information may be, for example, an API resource model, a client identifier and an authentication secret, logic for validating the client device request, logic for authenticating or authorizing the client device or an application executing thereon, or otherwise.

The service provided by the second server may enables, for example, interaction with a multi-tenant storage system operated by the CDN on behalf of content providers, a multi-tenant computing system operated by the CDN on behalf of content providers, and/or a configuration service for CDN delivery services.

The subject matter described herein has a wide variety of applications in content delivery and online platform architectures.

As those skilled in the art will recognize, the foregoing description merely refers to certain examples of the invention for overview purposes. It is not limiting and the teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The teachings hereof will be more fully understood from the following detailed description taken in conjunction with the accompanying drawings, in which.

DETAILED DESCRIPTION

Figure 1:
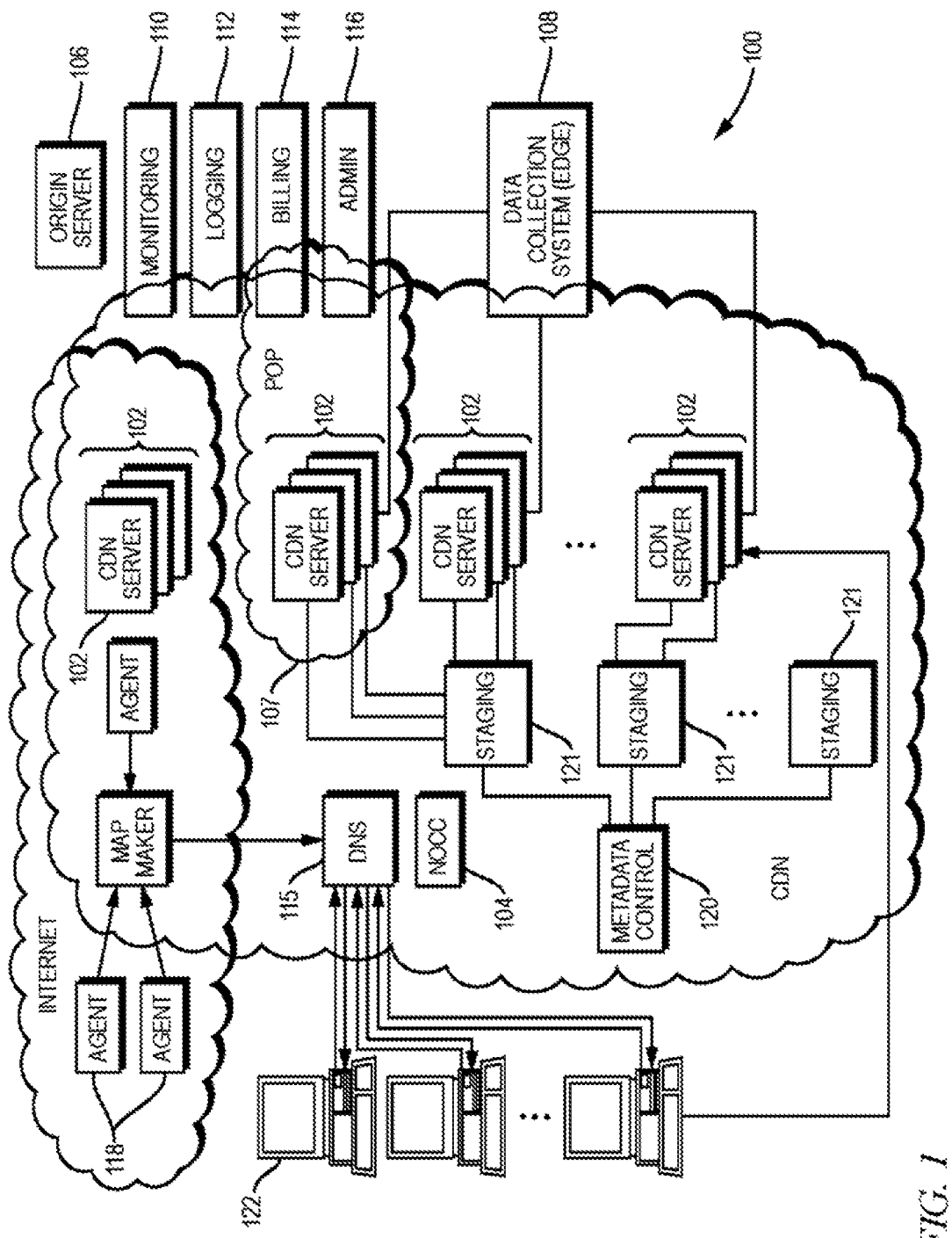
FIG. 1 is a schematic diagram illustrating one embodiment of a known distributed computer system configured as a content delivery network.
Figure 2:
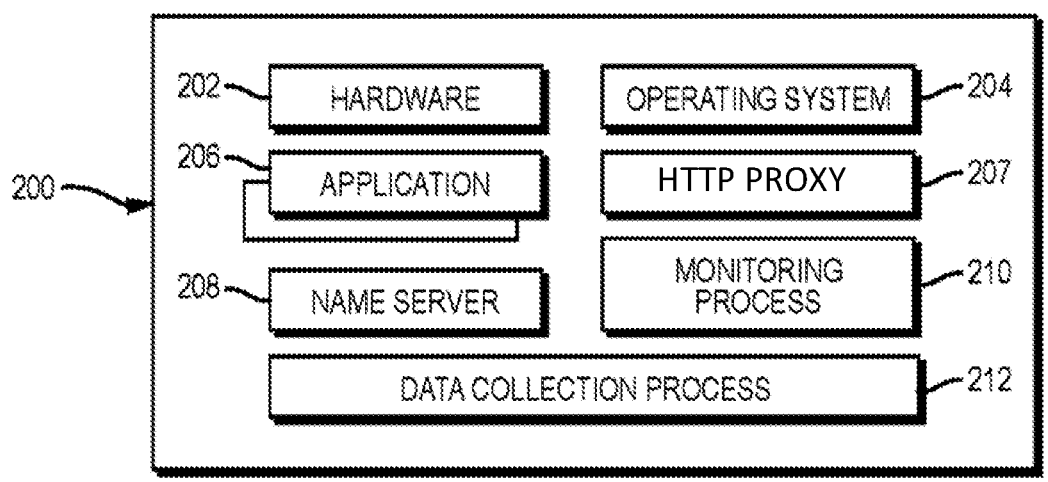
FIG. 2 is a schematic diagram illustrating one embodiment of a machine in the system of FIG. 1.

The following description sets forth embodiments of the invention to provide an overall understanding of the principles of the structure, function, manufacture, and use of the methods and apparatus disclosed herein. The systems, methods, and apparatus described herein and illustrated in the accompanying drawings are non-limiting examples; the scope of the invention is defined solely by the claims. The features described or illustrated in connection with one exemplary embodiment may be combined with the features of other embodiments. Such modifications and variations are intended to be within the scope of the present invention. All patents, publications and references cited herein are expressly incorporated herein by reference in their entirety. Throughout this disclosure, the term 'e.g.' is used as an abbreviation for the non-limiting phrase 'for example'.

Introduction

Content delivery can be provided by directing client requests for content (e.g., objects such as markup language files, images, scripts, CSS, streaming media, and the like) to the content delivery network—or more particularly, to one of the CDN's constituent servers. When the CDN receives client requests for content, it typically needs to have information about the identity and characteristics of the requested objects, as well as information about the features of the CDN platform that should be invoked when delivering those objects. In short, the CDN (and by extension its constituent servers) needs to have information about how to handle a content request.

This information is referred to herein to as "metadata." Metadata may include data about the content provider's objects, and more generally may include the set of all control options and parameters that determine how a given CDN server will handle a request for an object (be it an HTML file, images, CSS, scripts, streaming media, or other digital content). For example, a given object may have metadata associated with it that reflects such things as:

CP Code—an internal tracking number, primarily used for billing;

Origin Server—the location of the original copy of the object which a CDN server may need to fetch or revalidate the object (e.g., a content provider's server or NetStorage);

Coherence information—information such as a time-to-live (TTL) indicating how long CDN servers should cache the object before going to the origin server; this maintains the object's freshness.

Metadata may also specify that certain features of the CDN should be invoked when handling the request, and how to do so. These features may range from the use of certain routing technologies or cache-hierarchy-parents, to the modification of the content before serving it (e.g., particular web content optimizations or client-device-specific adaptations), to the selective invocation of redirect responses, to the application of certain security procedures (e.g., a web application firewall) to content posted (HTTP Post) from the client. These are merely examples. Such features may be applied at various stages in CDN server operation: when processing the client request, when generating a forward request to an origin server or other remote source, when receiving a response from origin, when generating a response to a client, and so on.

As a CDN grows and its feature set diversifies, the volume and complexity of metadata rises significantly. Moreover, the continuing move to cloud providers, such as providers of platform as a service (PaaS), infrastructure as a service (IaaS), and/or software as a service (SaaS), further complicates the management of metadata for a CDN.

For example, a CDN may have as a customer a cloud-provider who is offering a cloud-based service to its own cloud-customers (or in other words, to the 'cloud-users'). For purposes of illustration, assume the cloud-based service enables each cloud-customer to host their web sites on the cloud-provider platform. The cloud-provider then works with the CDN to have the CDN actually deliver the content from the hosting platform. From the CDN's perspective there is one direct customer relationship with the cloud-provider. However, that cloud-provider may want to have the ability to independently configure at least some or potentially all of its direct cloud-customer sites, be it for internal operational purposes or to be able to pass on a level of customization to its cloud-customers.

As an illustration, consider a cloud-provider who is a SaaS provider and offers a web application to its cloud-customers. The SaaS provider may want to configure its web application differently for each cloud-customer, again with the content being delivered by the CDN on behalf of the SaaS provider.

Consider further the case of a more traditional content-provider as described previously, but who desires dozens, hundreds, or even thousands of unique websites or other digital properties due the scale of their online operations. A single configuration will likely not suffice—as there will likely be a need for many different configurations for this one content-provider customer of the CDN.

With the foregoing by way of introduction, described below are embodiments of improved metadata systems and methods that address these and similar issues, and provide other functionality as will become clearer below.

Example Infrastructure

Figure 3:
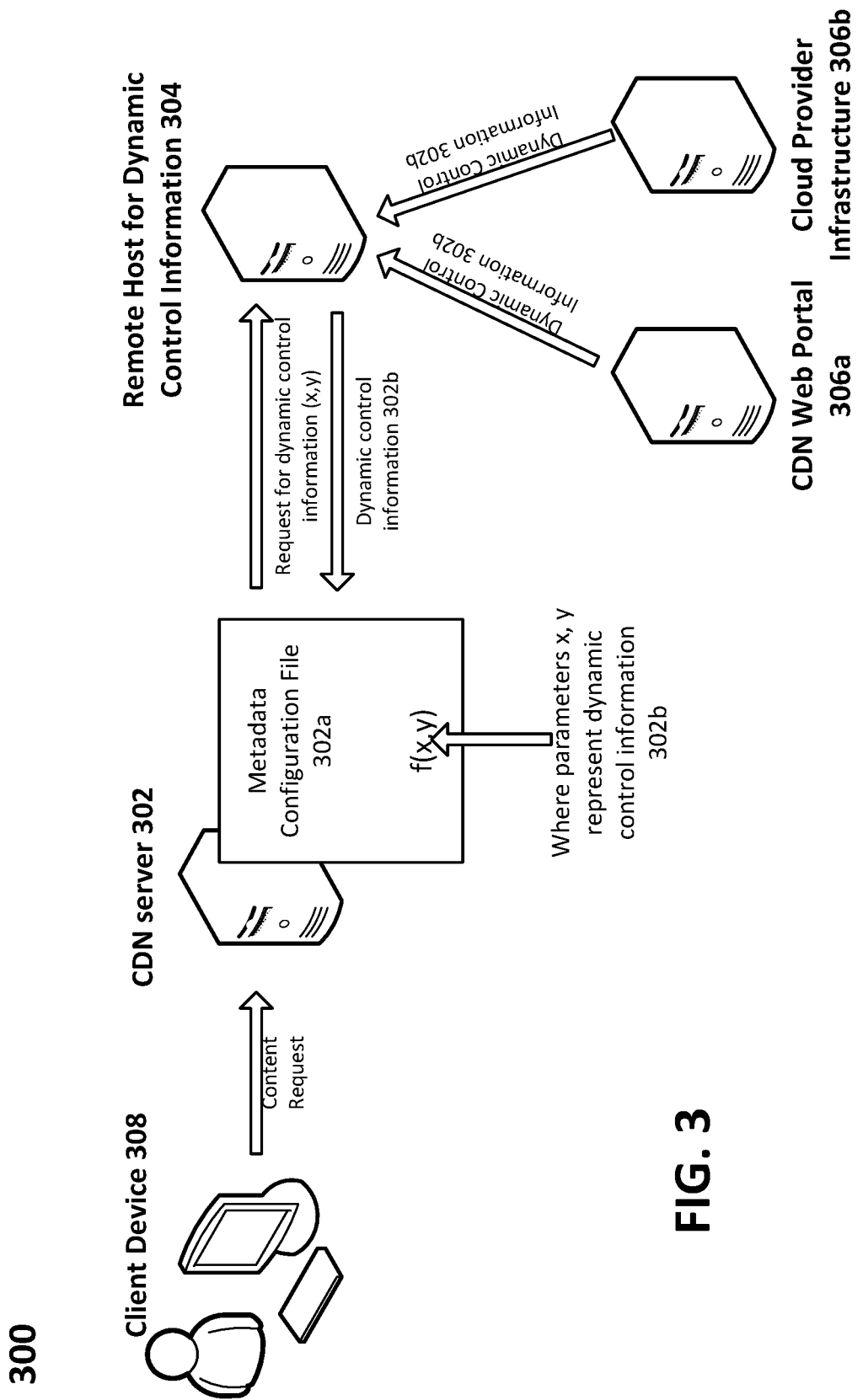
FIG. 3 is a schematic diagram illustrating one embodiment of an architecture for communicating metadata control information.

FIG. 3 illustrates one embodiment of a metadata infrastructure. Assume—for illustrative purposes only—that a given cloud-provider is a customer of a CDN for delivery and the cloud-provider has many cloud-customers who use its services and by extension those of the CDN, similar to the first example given in the Introduction. Assume further that a given cloud-customer's site can be accessed via the following hostname:

cloud-customer.cloud-provider.com (This is merely an example. The cloud-customer's hostname could equally well be the name 'www.cloud-customer.com' which is aliased, e.g., via CNAME, to the 'cloud-provider.com' domain, but the hostname above provides a suitable example for illustrative purposes.)

Assume further that a user operating a client device 308 seeks content at that hostname. The client device 308, running a client application such as a browser, initiates a DNS lookup on the hostname cloud-customer.site.cloud-provider.com, which is aliased (e.g., CNAME) to a CDN domain, and thus through a CDN name service the client device 308 given the address of a particular CDN server 302. This can all be done in the manner described previously and in U.S. Pat. No. 6,108,703, incorporated herein by reference.

The client device 308 sends a content request (e.g., an HTTP 'Get' or other HTTP method) to the CDN server 302 with a hostname header of cloud-customer.cloud-provider.com. The CDN server 302 locates and binds the request to a metadata configuration file(s) 302a that it has for the cloud-provider.com domain. This may be done, for example, by the CDN server 302 executing a DNS lookup and examining the CNAME chain to determine the CDN customer and customer identifier to use, for example as described in U.S. patent application Ser. No. 13/666,068, filed Nov. 1, 2012 and titled "Multi-domain configuration handling in an edge network server" (now published as 2013/0191499), the teachings of which are hereby incorporated by reference in their entirety.

The metadata configuration file 302a, which in one embodiment is an XML file, can contain certain (invariant) functions and possibly certain parameters used by those functions, as known in the art and described in U.S. Pat. No. 7,240,100, and it may be periodically be distributed and updated at the CDN server 302 as described therein (prior to being needed for client requests). However, the metadata in the configuration file 302a (sometimes referred to as 'static' or 'invariant' control data) can also contain references to dynamic, late-bound parameters for use in the metadata functions. These parameters are preferably obtained by the CDN server 302 when needed to parse and execute the metadata configuration file 302a (e.g., at the time of the client request or at some other stage of processing). It should be noted that the approach is not limited to injected parameter values for use in defined functions. In some cases, the injected information can represent certain metadata functions or logic. For convenience of description, all such kinds of dynamic information will be generally referred to herein as dynamic control information 302b. The dynamic control information 302b represents a layer of abstraction within the metadata configuration file 302a, and can be thought of as a just-in-time item of control information for the CDN server 302. In some embodiments, the dynamic control information is a complex delivered in the form a content policy, which may contain both parameters and logic that effects the desired policy. Content policies are described in more detail below.

By way of illustration, consider a metadata function in the configuration file 302a that checks the HTTP referrer header of an incoming request against a white-list of permitted referrers (e.g., a list of permitted hostnames). The function might be a regular expression match run (by the CDN server 302) on the referrer header against the whitelist, e.g., expressed in XML. Rather than hard-coding the whitelist into the metadata configuration file 302a, the whitelist is declared as a parameter whose value(s) must be retrieved by the CDN server to evaluate the function. This is but one example of the concept.

As noted above, the CDN server 302 is responsible for obtaining the required late-bound dynamic control information 302b from a remote host 304. In one embodiment, before processing the request, the CDN server 302 invokes an intermediate processing routine that parses the metadata configuration file 302a, determines the data dependencies, and obtains and injects the necessary dynamic control information 302b to fulfill these dependencies in the metadata configuration file 302a. The complete metadata configuration file 302a can then be applied to process the client request.

As shown in FIG. 3, in one embodiment, the CDN server 302 makes a call, e.g., a service provider interface (SPI) call, to a remote host 304 to obtain the requisite dynamic control information 302b. As those skilled in the art will recognize, the SPI means that the CDN as the calling party will define the interface specifics, in this embodiment. Thus, in this implementation the remote host 304 may be any system compliant with the SPI, e.g., a system run by the CDN, system run by the CDN customer (the cloud-provider), or even a system run by the cloud-provider's customers (the cloud-customers). In the illustrated embodiment, the remote host 304 is a CDN-operated system in a highly-available platform such as managed network storage facility (aka NetStorage) or otherwise, storing a database 400. The database 400 has the dynamic control information 302b. The CDN may provide a web-enabled portal 306a or other user interface through which, for example, a particular cloud-provider and/or cloud provider's cloud-customer can configure or update the database. Alternatively, the cloud-provider may have its own infrastructure 306b storing its control information which is periodically communicated through an appropriate applications programming interface (API) to the CDN's remote host 304.

Content Realms

Preferably the system 300 utilizes the concept of a 'content realm' to manage the retrieval and use of dynamic control information 302b. The 'content realm' defines the context for which the dynamic control information 302b is being retrieved. Hence, a given CDN customer may be associated with many different defined content realms. If the CDN customer is a cloud-provider, for example, a content realm might be defined for each of the cloud-provider's cloud-customers. For a CDN customer that uses the functionality defined herein to manage several different websites or other digital properties, the content realm might correspond to each site, etc. A content realm could also be associated with a particular area of a site, or with a particular category of products displayed on a given site, and the like.

Figure 4:
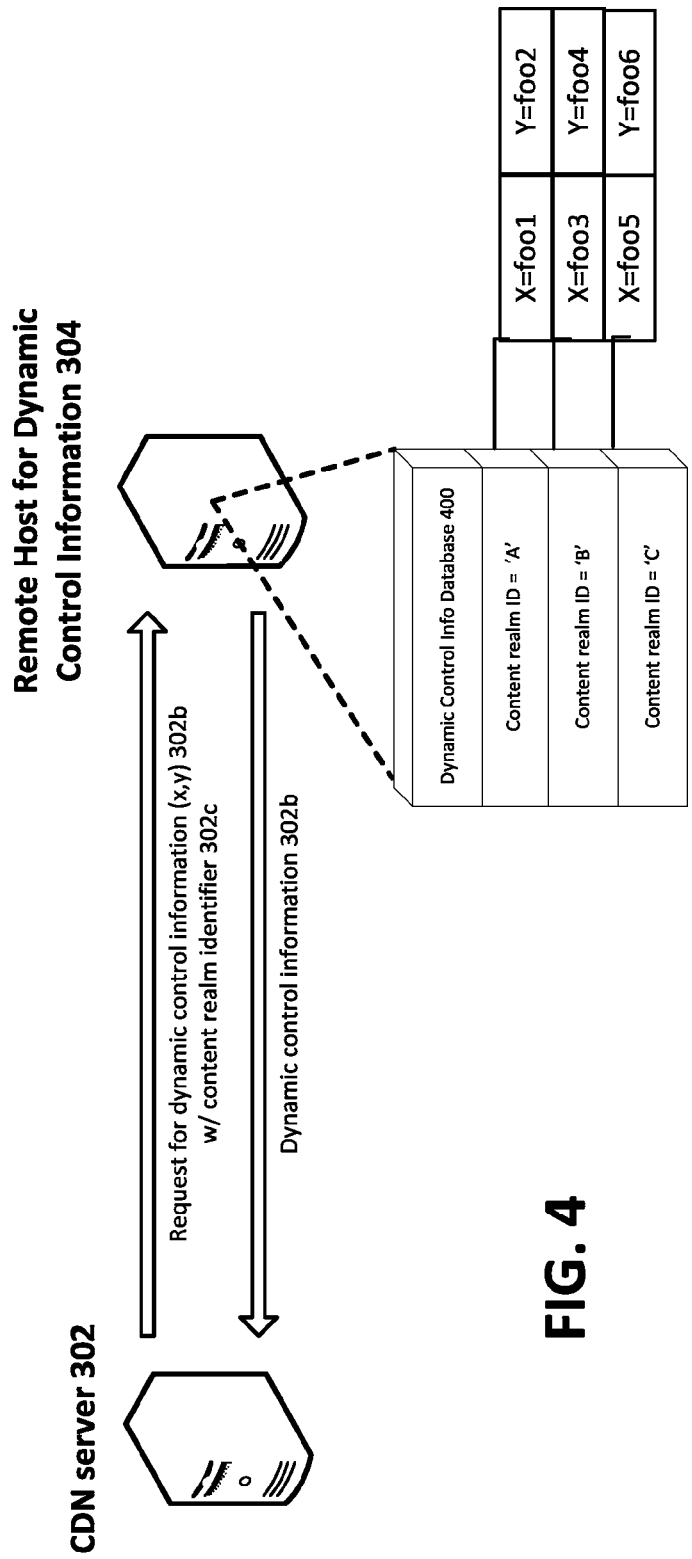
FIG. 4 is a schematic diagram illustrating an embodiment of an architecture for communicating metadata control information.

Preferably, the CDN customer defines the scope and meaning of the content realm. Then, during the processing of a content request from a client device 308, the CDN server 302 determines the content realm identifier (ID) 302c and passes it via the SPI to the remote host 304, which uses the content realm ID to return the appropriate corresponding set of dynamic control information. In this way, assuming the content realm ID corresponds to a cloud-provider's cloud-customer, the dynamic control information 302b for the appropriate cloud-customer is retrieved and injected into the metadata configuration file 302a. FIG. 4 illustrates this process. In FIG. 4, the CDN server 302 makes an SPI request for dynamic control information 302b consisting of two parameters x, y and sends a content realm ID 302c with value A, B or C. Assume that the content realm ID 302c corresponds to a particular cloud-customer. In the database 400, the value of x,y depends on the content realm ID since different cloud-customers may need or desire different content handling features. The remote host 304 looks up the values based on the content realm ID 302c and returns them to the server 302 for binding to the variables that were declared in the metadata configuration file 302a.

The CDN server 302 can determine the content realm identifier 302c in a variety of ways. As mentioned, preferably the CDN customer defines the desired content realm 302c, and logic for determining the content realm ID 302c may be included in the configuration file 302a. The specific logic to determine the identifier 302c will be dependent on what it signifies. Preferably the CDN server 302 extracts the content realm ID 302c from some aspect of the content request transaction/message exchange that occurs between itself and the client device 308. For example, if the identifier 302c represents a cloud-provider's cloud-customer, the server 302 might extract a content realm identifier 302c from the host header of the request (e.g., the subdomain "cloud-customer" from "cloud-customer.cloud-provider.com"). The identifier also might come from an intermediate hostname or portion thereof in an DNS aliasing (e.g., CNAMING) chain that the CDN server 302 obtains by performing a DNS lookup on the host header hostname (for example as described in U.S. patent application Ser. No. 13/666,068, filed Nov. 1, 2012 and titled "Multi-domain configuration handling in an edge network server", now published as U.S. Patent Publication No. 2013/0191499, the contents of which are hereby incorporated by reference). Alternatively, the CDN server 302 might extract the identifier 302c from the requested URI pathname or other URI component, or from some other HTTP request header. (Note that the term URI used herein includes universal resource locators or URLs, as known in the art.) Hence, the content realm ID might correspond to a product identifier in the universal resource identifier (URI) pathname, such that, for example, objects under /pathfoo/products1/* are identified as a different content realm, and thus controlled by different dynamic control information, than objects under/pathfoo/products2/*. The content realm ID 302c might be derived from the user agent header field, such that a client Windows machine matches to a different content realm, and thus warrants different dynamic control information 302b, than a client machine running another operating system, for example, or such that a wireless client matches to a different content realm than a desktop PC.

Figure 5:
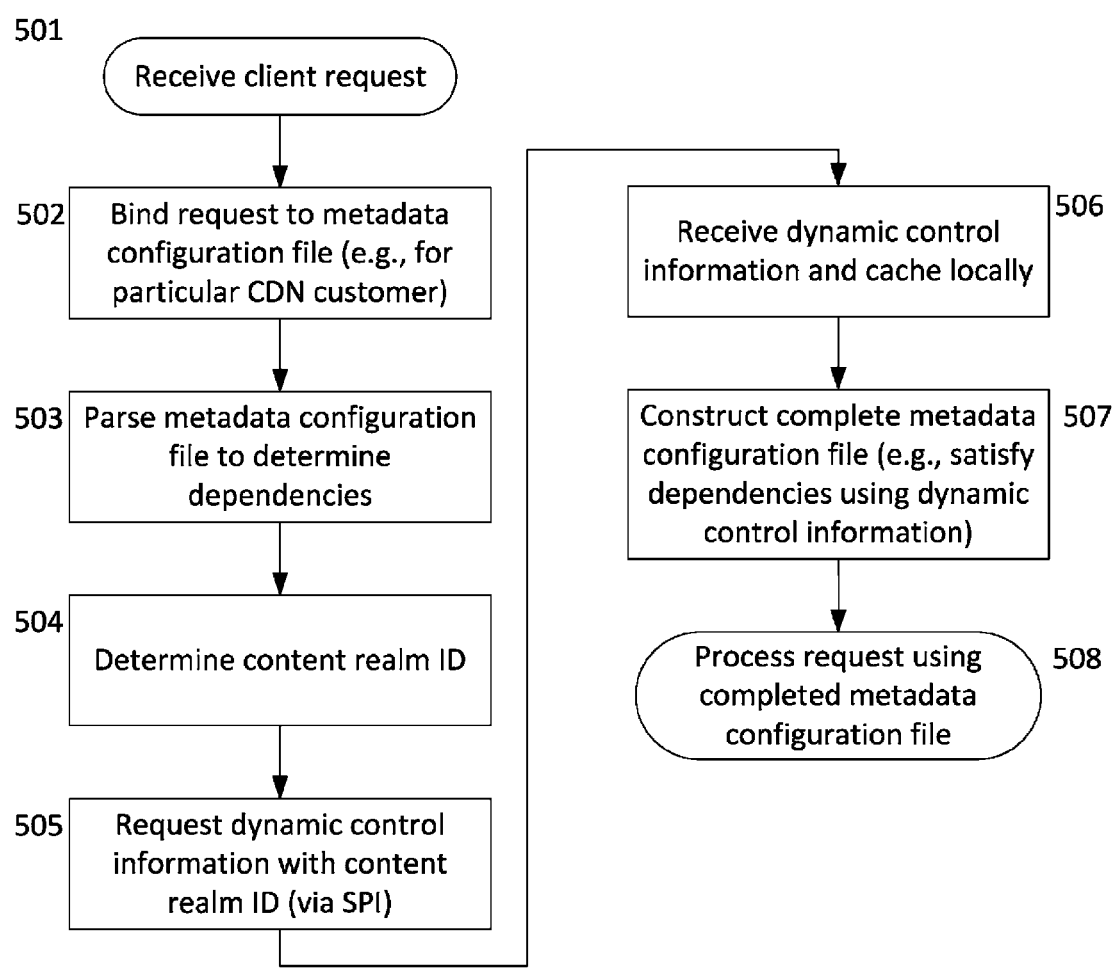
FIG. 5 is a diagram illustrating an embodiment of a logical flow within a CDN server.

FIG. 5 illustrates, in one embodiment and at a high level, the logical flow within a CDN server 302 to effect the late-binding of control information as described above. In FIG. 5, at step 501 the CDN server 302 receives the client request. At 502, the CDN server binds the request to a metadata configuration file (e.g., based on the host header, which is associated with a particular CDN customer, as previously described with reference to U.S. Pat. No. 7,240,100 and/or US Patent Publication No. 2013/0191499). At 503, the CDN server 302 parses the metadata configuration file 302a to determine dependencies on dynamic control information, and at 504 determines the content realm ID. At 505 and 506, the CDN server 302 requests the needed dynamic control information from the remote host 304 using the content realm ID and receives back the dynamic control information, caching it locally for future use. At 507, the CDN server 302 constructs the complete metadata configuration file and then (508) processes the client request in accordance therewith.

Caching

Fetched dynamic control information 302b is preferably cached locally at the CDN server 302 after it is received from the remote host 304. Thus, in one embodiment, the CDN server 302 will pull needed dynamic control information 302b from the remote host 304 the first time that a client request necessitates it. For example, the information 302b needed to respond to a request for a particular HTML file will be retrieved and cached (note that the control information needed to handle requests for embedded objects in the HTML file, and/or for other likely-to-be-requested HTML files, might be pre-fetched at the same time). For subsequent requests by the same or another client device 308, the CDN server 302 can use the locally cached information. The local cache entries can be associated with a time-to-live (TTL) so that the CDN server 302 periodically refreshes dynamic control information 302b. Preferably, the refreshing of the information is synchronous to client requests, as described above. However, in alternate embodiments, this periodic refresh of dynamic control information 302b may be asynchronous to the client requests.

Local caching does not require storing dynamic control information 302b for all objects or for all parties served by the CDN. Rather, the CDN server 302 preferably retrieves only the dynamic control information 302b necessary to respond to the particular client content requests that it is receiving, caching the data 302b as space permits and evacuating old entries the cache with a least-recently-used or other cache-management algorithm. The CDN server 302 is typically one of many in the CDN and typically sees some portion of the overall traffic. This means that mapping and load-balancing algorithms implemented with the CDN, which spread client content request load amongst various CDN servers 302 in the platform, will concomitantly result in spreading the 'load' of requesting and storing dynamic control information 302b, and provide a scalable solution for the metadata control infrastructure. Put another way, in a preferred embodiment, the load for dynamic control information 302b will follow load for client content requests.

For example, U.S. Pat. No. 6,108,703 describes in one embodiment a method for intelligently routing and replicating content over a large network of distributed servers. The teachings of U.S. Pat. No. 6,108,703 are hereby incorporated by reference in their entirety.

The foregoing is by way of example only. Any mapping, traffic-shaping, load-balancing or similar policy in the network can be leveraged. Further, it should be noted that it is possible to impose a policy for the dynamic control information 302b that differs from the policies in place for the client content requests (e.g., it may be desirable in certain situations to push or pre-populate dynamic control information 302b to certain regions of CDN servers in a way that is not related to how objects are distributed).

Purge Example

In one embodiment, the system 300 can be used to purge "on-demand" objects cached in the CDN servers. Purging objects involves invalidating them (e.g., marking their TTL as 'expired') so that they are not served from the CDN server's cache in response to client requests but instead are retrieved from or revalidated from the origin/source server, thus refreshing the cache.

For example, for a given content request for a particular object, the CDN server 302 can execute an 'invalidate' function defined in the associated metadata configuration file 302a. The function can determine whether the requested content should be purged and depends on a late-bound parameter from the remote host 304. In this way the purge function can be, at least in one embodiment, accomplished selectively and quickly, as it will take effect once the database on the remote host 304 is updated.

In one implementation, a function in the metadata configuration file 302a takes as a parameter an identifier for an object or set of objects (e.g., the identifier may be a URI pointing to a specific object or a URI path with wildcard/pathfoo/* covering objects in that path) and sets the TTL of the identified object(s) to be 'expired.' The late-bound parameter is pulled from the remote host 304. The remote host 304 responds with the particular URI, causing the function to set the objects cached under the particular returned URI to 'expired.' This technique can be used to purge not only the requested object but other objects at the same time.

In another implementation, the function in the metadata configuration file 302a expects a Boolean true/false and sets the TTL of the requested object to 'expired' (or not) depending on the answer. The CDN server 302 sends a content realm ID 302c to the remote host 304 comprising an object URI or other identifier. The remote host 304 looks up the object URI (or other identifier) among URIs (or other identifiers) that have been designated in the database 400 for purging, and returns 'true' if a match is found.

Figure 6:
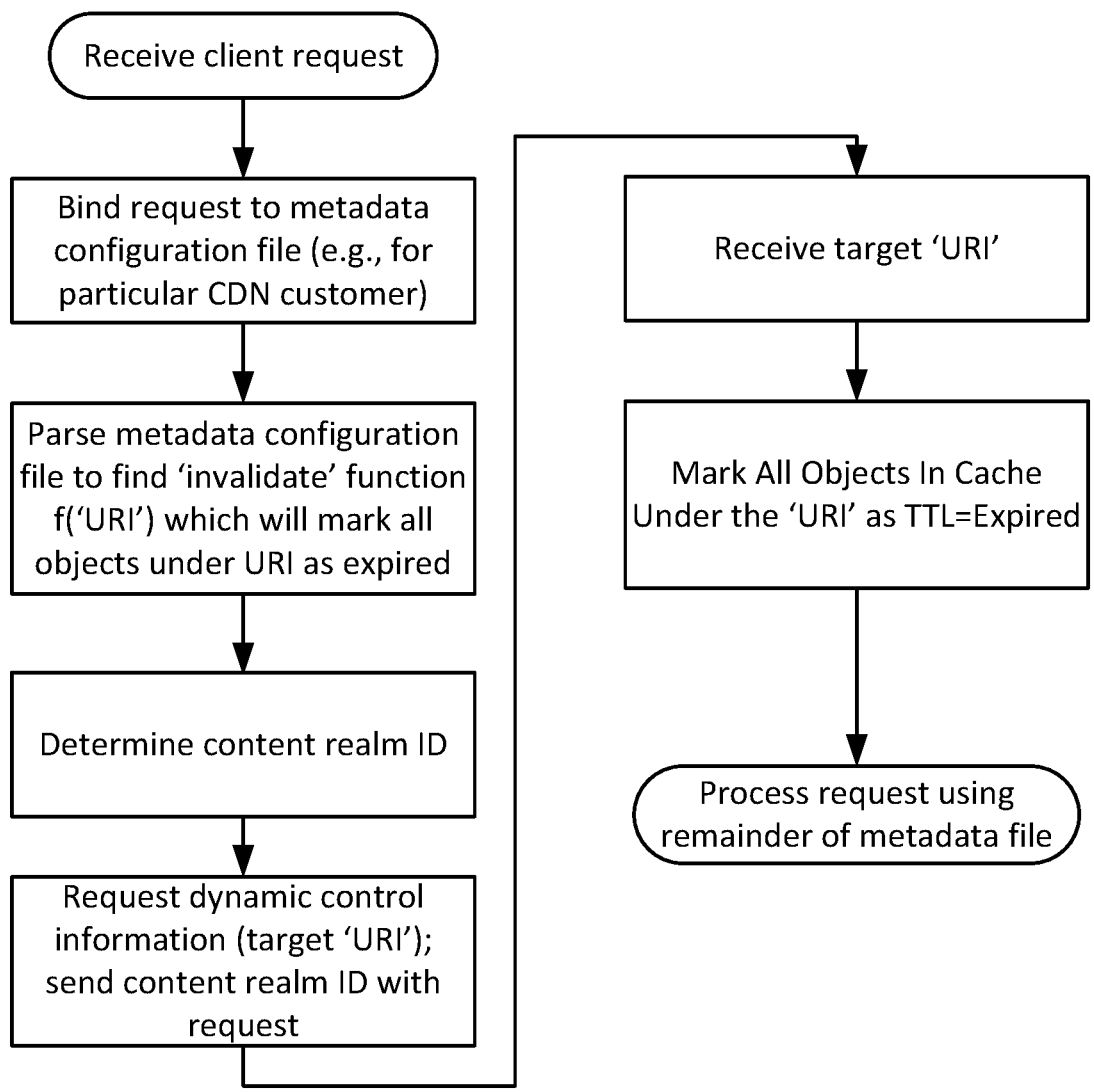
FIG. 6 is a diagram illustrating an embodiment of a logical flow in a CDN server.

These are just two of a variety of possible implementations and are provided merely for illustrative purposes. FIG. 6 is a flowchart illustrating the first implementation of the 'purge process' described above.

Logging of SPI Traffic

Referring to FIG. 3, in one embodiment, the traffic for dynamic control information 302b that flows between the CDN server(s) 302 and the remote host 304 can be logged, measured and used for billing purposes. Hence, the more complex the configuration for a particular customer's websites and other digital properties, the more they might be charged.

Multi-Dimensional Control & Evaluative Logic at Remote Host

In an alternate embodiment, the dynamic control information 302b at the remote server 304 is embodied in a content policy document with embedded logic that enables the remote host 304 to return, for a given content realm ID 302c, different answers that depend on other data that the CDN server 302 sends with the SPI request. This additional layer adds a further dimension of control to the infrastructure.

Figure 7:
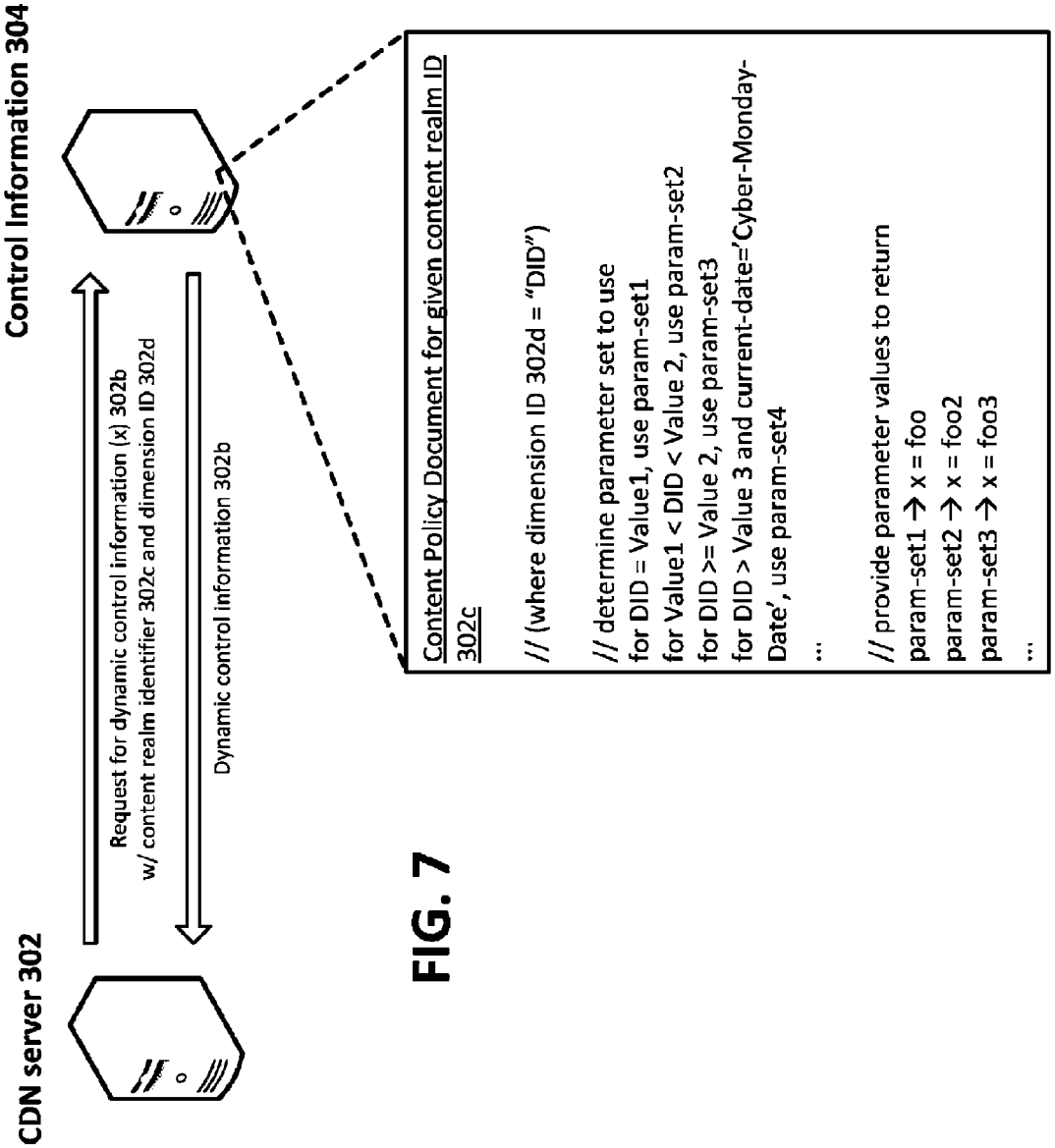
FIG. 7 is a diagram illustrating an embodiment of system in which the remote host evaluates logic in a content policy document to determine control information to return.

FIG. 7 illustrates an example. Assume that, as a result of a client content request (e.g., as shown in FIG. 3), the CDN server 302 makes an SPI request for dynamic control information 302b (a single parameter 'x', in this example) and sends a content realm ID 302c, as well as other data (referred to in this example and in FIG. 7 as a 'dimension ID' 302d). Though the dimension ID 302d could represent any piece of information, it is often something that is derived from the content request or some circumstance existing at the time of the request. The content policy document contains a logical layer that matches the given dimension ID 302d to a bucket/category and then returns the corresponding dynamic control information 302b for that category. As those skilled in the art will recognize, sets of multiple parameters could be determined and returned in this way.

In one use case, the dimension ID 302d could be a geographical identifier or country name derived from the client IP address by the CDN server 302. Then, the category could represent a geographical region, allowing a website owner to configure the site to respond differently for different regions, based essentially on data injected into the flow at the CDN server 302. Similarly, the CDN server 302 might inject data about the requesting client device (e.g., its browser, screen size, support for certain software, support for touchscreen, whether it is a mobile device, etc.) as the dimension ID 302d, which the CDN server 302 can determine based on the user agent or other header in the client's content request. The dimension ID might also be representative of the client's connectivity (e.g., broadband, mobile, etc.) as measured by the CDN server 302 or as otherwise determined.

As shown in FIG. 7, a variety of logic and functionality can be included in the policy document. This logic is evaluated by the remote host, taking the inputted data (the dimension ID(s) and returning control information 302(b).

More than one dimension ID 302d is possible, resulting in a rich set of configuration options.

Complex Policy Enforcement

As noted previously with respect to FIG. 3, in some embodiments the late-bound dynamic control information 302b may include functions or logic. Such functions and logic can be transmitted to the CDN server 302, bound to the appropriate metadata configuration file 302(a) reference, and executed by the CDN server 302 to help determine how to handle the traffic.

Such dynamic control information 302b may have a dependency on any of a wide range of information known at the CDN server 302. Examples include information the CDN server 302 obtains from a HTTP request header field, request method, request URI or portion thereof, information in a cookie, a time of day, a geography associated with the client, information about the client device (e.g., such as screen or operating system or OS installed, and derived from an HTTP user-agent header or otherwise), client bandwidth information, and so on.

For example, as is known, a metadata logical component can be written in XML, and can instruct the CDN server 302 to take certain actions, or apply certain CDN features, when certain metadata conditions are met. The metadata might also employ a scripting language or other desired instruction sets or program language. U.S. Pat. No. 7,240,100 (mentioned earlier and incorporated by reference) describes a metadata component that rewrites an origin-request-URI based on the CDN server's 302 knowledge of the client's bandwidth. If this component is active, requests from clients identified as "high" bandwidth are rewritten accordingly, e.g., from /foo/bar.gif to '/foo/bar.hi.gif.' Request from clients identified as "low" bandwidth preferably are not rewritten.

According to the teachings hereof, the dynamic control information 302b may be metadata logic, such as the above conditional rewrite logic. More specifically, the metadata configuration file 302a shown in FIG. 3 can contain a reference to dynamic control information 302b, which would represent a chunk of code (e.g., XML or otherwise) instructing the CDN server 302 to effect the conditional high/low bandwidth rewrite on requests from clients.

As another example, consider the HTTP referrer check function discussed previously, and assume that it is desired to have the HTTP referrer-check functionality applied only to image objects (that is, only for client requests for images are checked to see if the referring URI is a valid one). The metadata in the configuration file 302a might specify that a client request is to be denied if it fails the referrer check, and reference dynamic control information 302b for how to execute the referrer check logic. The late-bound logic could contain code that instructs the CDN server 302 to apply a referrer check only if the request is for a certain image type (e.g., jpg, gif, etc.), and indicate that the referrer check is otherwise has been satisfied, i.e., it is unnecessary. In case the request is for an image, the logic could also supply the values for the whitelist (e.g., the hostnames, IP addresses, etc., that are on the whitelist) for evaluation by the CDN server 302 against the actual client request. Thus, both the way that the referrer check functionality operates and the values/data that it relies on can be specified on a per-content realm basis, and obtained by the CDN server 302 as needed.

The foregoing referrer check functionality may be implemented, in one embodiment, by having the logic expressed in a chunk of code in the same language as the metadata configuration file 302a (e.g., XML). The metadata configuration file 302a would contain a reference to the dynamic control information 302b, and in response the CDN server 302 would obtain the referenced chunk of XML, code and insert it inline into the configuration file 302a (in this case, also XML), executing it as it does the remainder of the configuration file 302a.

Complex units of dynamic control information may be thought of as content policies. In effect, the remote host 304 stores a content policy, represented by dynamic control information 302b for a given content realm ID 302c, and the CDN server 302 executes the logic to enforce that content policy. The policy may both set the value of variables in the configuration file 302a and provide functions and logic.

Figure 8:
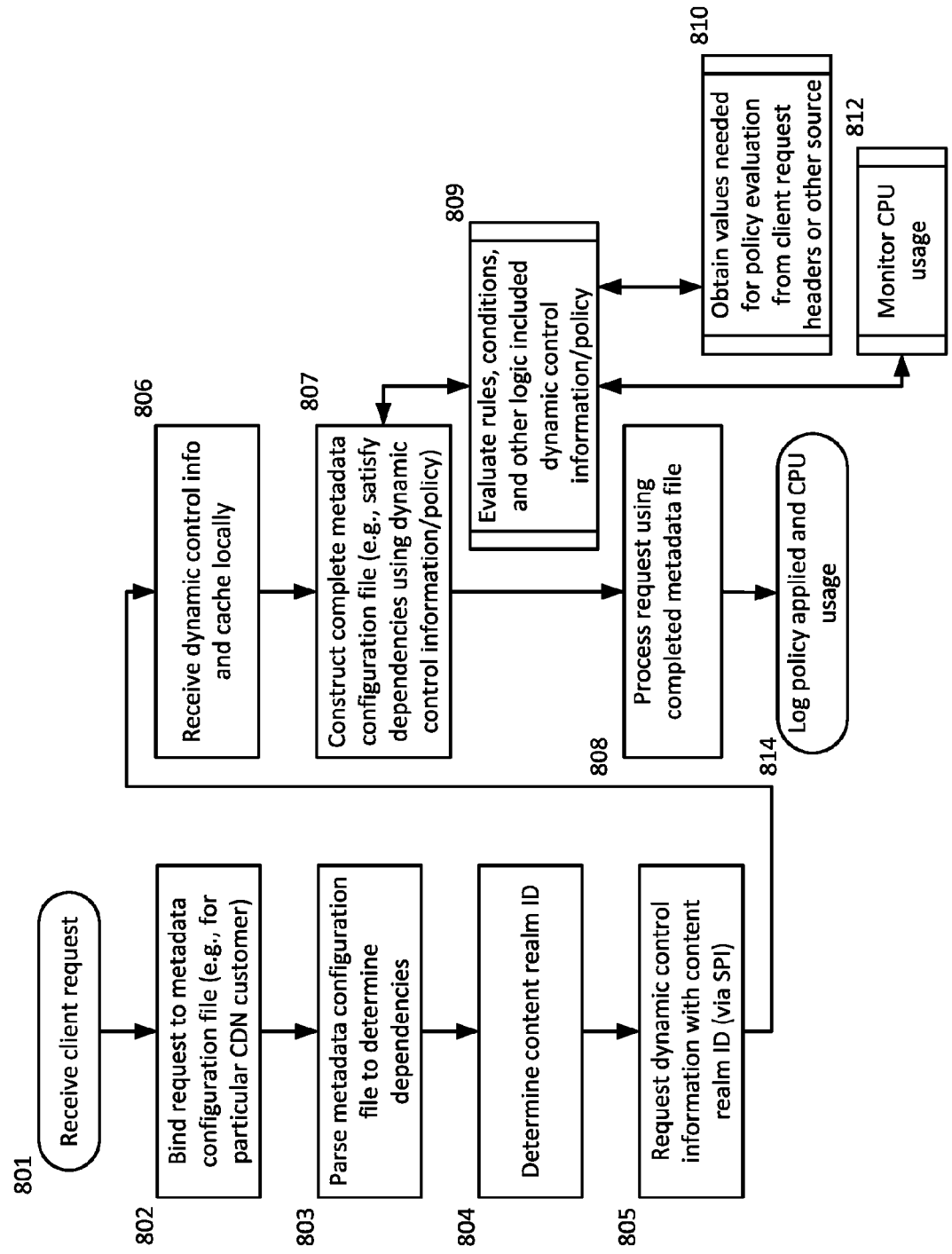
FIG. 8 is a diagram illustrating an embodiment of a logical flow in a CDN server.

FIG. 8 illustrates logical flow in a CDN server with respect to complex dynamic control information. Steps 801-808 track steps 501-508 in FIG. 5, but in FIG. 8 substeps 809, 810, 812, 814 reflect additional proceeding related to the complex control information and a CPU usage mechanism for billing customers based on the complexity of their policies which will be described further below.

A content policy can be implemented using the syntax and structure described below, in which the dynamic control information is referred to as a content policy encoded as a policy assertion resource. Here is an example of a protobuf file format for use in generating and sending policy assertion resources:

```
package dynamic_control_info;
enum ConditionType {           //conditions that the CDN server 302 can be asked to evaluate for a
                               //given HTTP message exchange for a customer entitled to use
                               //them, e.g., what is the request HOST (hostname), what is the
                               //HTTP request method (get, post, put etc.), what is the scheme of
                               //the requested URL, and so on.
    REQUEST_HOST                    =0;
    REQUEST_COOKIE                  =1;
    REQUEST_HEADER                  =2;
    REQUEST_METHOD                  =3;
    REQUEST_URL_SCHEME              =4;
    REQUEST_URL_PATH_COMPONENT      =5;
    REQUEST_URL_EXTENSION           =6;
    REQUEST_URL_FILENAME            =7;
    REQUEST_URL_PATH_PARAM          =8;
    REQUEST_URL_QUERY_STRING        =9;
    REQUEST_URL_WILDCARD            =10;
    REQUEST_CLIENT_IP               =11;
```

```
        REQUEST_CLIENT_IPV6          =12;
        RESPONSE_CACHEABILITY        =13;
        RESPONSE_HEADER              =14;
        RESPONSE_STATUS              =15;
        RANDOM                       =16;
        TIME                         =17;
        VARIABLE                     =18;
        PHRASE                       =19;
        REGEX                        =20;
}
message Parameter {
    required string value         =1;
    optional bool   case_sensitive =2 [default=true];  // comparison is case sensitive
    optional bool   has_wildcard  =3 [default=false]; // '?' or '*' interpreted as wildcard char
    optional bool   is_range      =4 [default=false]; // value is a range e.g. 20:100 or 20:
    optional bool   is_escaped    =5 [default=false]; // value compared in escaped form or
                                                      //unescaped form
    optional bool   recursive     =6 [default=false]; // match applies only to current
                                                      //directory or any
}
message Condition {
    required ConditionType type  =1;
    repeated Parameter    param  =2;
    optional bool         negated =3 [default=false]; // comparison result is negated
}
message Category {
    required string   name         =1;     // [a-z0-9-\.]+
    repeated Condition condition   =2;
    repeated Category subcategory  =3;
}
message Taxonomy {
    optional string   name      =1;        // [a-z0-9-\.]*
    repeated Category category  =2;
}
message Variable {              //allows a variable name & value to be set for given
                                //policy rule
    required string name     =1;    // [A-Z][A-Z0-9_]+, max 64 characters
    required string value    =2;    // max 8192 characters
    optional bool   sensitive =3 [default=false];
}
message Rule {
    required string selector =1;    // taxonomy/cat1/cat2/cat* AND OR NOT ( )
    repeated Variable result =2;
}
message Policy {
    required string name  =1;       // [A-Z0-9] | "-" | "."
    repeated Rule   rule  =2;
}
message ContentPolicy {
    repeated Variable global    =1;    // optional global variables
    repeated Taxonomy taxonomy  =2;
    repeated Policy   policy    =3;
}
message Signature {
  required string name =1;
  required bytes  data =2;
}
message Envelope {           // envelope protects against truncation
    required ContentPolicy content_policy = 1;
    optional string        version        = 2;
    optional string        generation_id  = 3;
    optional string        content_realm  = 4
    optional string        signature      = 15;
}
```

The root Envelope message contains a content policy which lists policies, and taxonomies that categorize traffic (e.g., request messages from clients, responses from origin servers, or other messages being processed at the server) into categories and subcategories. In this example, the Envelope also includes a version, a generation_id that acts as a handle for a class of content policies (e.g., to enable revocation of a given class of policies all at once), a content_realm_id to verify that the content policy is indeed for the content_realm that was requested from the remote host, and a signature with a key and some data that can be used to verify the authenticity of the policy.

A policy contains a set of rules, each rule has a category path selector and a list of name/value pairs that define the outcome for that selector match, e.g., by setting the named variable to the specified value. The specified value of the variable can then be used by the CDN server 302 when evaluating the metadata configuration file 302a and encountering any references to that variable. Thus, the categorization of traffic using taxonomies and application of rules/selectors can be used to effect logic representing dynamic control information 302b, as described previously.

A selector may contain wildcards so '*' would mean any category, '*/protected' would mean any category that has a subcategory 'protected' that matches. The lack of a selector means the policy applies to all traffic, which can be the same as '*' but more efficient. A selector forces the evaluation of category conditions. A category has a list of conditions that all have to be true, except for conditions marked as 'NEGATED' which have to be false.

Category trees are segmented into mutually exclusive taxonomies. One can use the URI syntax of "//" to dereference the taxonomy in a selector, for example: "//europe/images/*". In case of the absence of "//" in the URI, the first taxonomy is assumed.

Selectors can combine multiple category path URIs with the following Boolean operators: AND, OR, NOT. Parentheses '(' and ')' can be used as part of the Boolean expression.

In operation, the CDN server 302 pulls a particular policy from the remote host 304 and enforces the policy by evaluating the selector and the conditions/traffic categories on which it depends, thereby setting variables, and the like. (As before, preferably the remote host 304 stores many different policies—with their own potentially different selectors, conditions, variable values, etc.—and returns a particular policy based on a content realm ID 302c presented by the CDN server 302, which policy is then evaluated.)

Using this approach, the referrer check function described previously may be implemented as follows:

```
content_policy {
    taxonomy {
        category {
            name: "images"
            condition {
                type: REQUEST_URL_EXTENSION
                param {
                    value : "jpg gif png"
                }
            }
        }
    }
    policy {
        name: "REFERRER-CHECK"
        rule {
            selector: "images"
            result {
```

-continued

```
                name: "WHITE_LIST"
                value: "www.site1.com site2.com *.site3.com"
            }
        }
    }
}
```

The above code implements a "REFERRER-CHECK" policy that is subject to a rule with a selector named "images", indicating that the WHITE LIST values shall apply to traffic that meets the condition of being image traffic (i.e., falling within the 'image' category of traffic). The 'images' category is defined in the taxonomy to be traffic with a .jpg, .gif or .png file extension in the requested URI in the client request.

The corresponding metadata configuration file 302a could contain the following XML code referencing the policy:

```
<match:content-policy name="REFERRER-CHECK"
variable-list="WHITE_LIST">
    <match:request.header name="referrer" value="%(WHITE_LIST)"
value-wildcard="on" result="false">
        <auth:traffic.deny>referrer_check</auth:traffic.deny>
    </match:request.header>
</match:content-policy>
```

Thus, the metadata inside the <match> is executed when the REFFERER-CHECK policy evaluates to true, i.e., the traffic is for an image. The embedded <match> evaluates whether the current client request has a referrer header that is on the "whitelist" with the value of the variable "whitelist" having been set by the REFFERER-CHECK policy. If not, then the embedded traffic denial function is executed to deny the client request.

As another example, consider a policy that specifies when to take particular action, and does not set the value of a "whitelist" or other variable. The particular action might be to deny the traffic (e.g., deny a particular client request) at the CDN server 302, for example. The action is either performed, or not performed, based on the evaluation of the policy.

By way of illustration, below is an excerpt of a configuration file 302a containing a reference to such a policy, in XML format:

```
<match: content-policy name = "UNAUTHORIZED_REQUEST">
    <auth: traffic.deny> unauthorized_request</auth:traffic.deny>
</match: content-policy>
```

If the "UNAUTHORIZED_REQUEST" policy rules evaluates to true, the traffic will be denied per the encapsulated tag for auth:traffic.deny. There are no variables for the policy to set, in this example.

Here is the policy itself:

```
content_policy {
    taxonomy {
        name: "authz"
        category {
            name: "host"
            condition {
                type: REQUEST_HOST
                param {
                    value : "www.example.com
```

```
                api.example.com images.example.com"
            }
        }
    }
    category {
        name: "country"
        condition {
            type: GEOGRAPHY
            param {
                value : "COUNTRY_CODE"
            }
            param {
                value : "US"
            }
            negated: "true"
        }
    }
}
policy {
    name: "UNAUTHORIZED_REQUEST"
    rule {
        selector: "NOT //authz/host OR NOT//authz/country"
    }
}
}
```

This policy has defined a selector that the CDN server 302 will need to resolve (evaluate). As mentioned, if the selector evaluates to true, the action traffic.deny will be applied to the message at hand (e.g., the client request), otherwise not.

The selector rule is dependent on two arbitrary namespaces that have been declared for traffic categories, specifically "host" and "country" under the "authz" taxonomy (a namespace of authorizations). The "host" and "country" namespaces are conditional classes of traffic and the CDN server 302 must evaluate the conditions. In this case, the author of the content policy has decided to create the "//authz" taxonomy, which includes one category of traffic for authorized Host headers ("host") and another category of traffic for authorized client countries ("country"). In this example, REQUEST_HOST and GEOGRAPHY are types of conditional computation performed by the CDN server 302 that the customer is entitled to as part of their product definition/contract.

In sum, traffic that is for an unauthorized host, or from an unauthorized country, causes the rule selector to evaluate to true, which is reflected in the metadata configuration file 302a and causes the execution of the deny function, and thus the CDN server 302 denies the given request.

In this example, the policy effectively acts a firewall rule, determining under what circumstances the deny function should be invoked. The policy, as dynamic control information 302b, is obtained by the CDN server 302 when needed and can be changed while keeping the metadata configuration file 302a static. Further, since a different policy can be maintained for each content realm ID 302c, the above approach enables one version of metadata configuration file 302a to be linked to and apply multiple firewall policies. For example, a configuration file 302a for a given cloud-provider can be linked to a variety of custom policies for the cloud provider's cloud-customers, with the content realm ID 302c identifying each cloud-customer.

Validation/Authentication/Authorization Layer Example

In some embodiments, the techniques described herein can be leveraged to create a request processing layer that can validate, authenticate, authorize and/or perform other processing on client requests. This layer can be implemented in a given CDN server 302, enabling a set of geographically distributed CDN servers 302 to serve as a distributed request processing gateway to resources behind them. For convenience of description, this validation/authentication/authorization layer will be referred to herein as a "VAA" layer, although not all these functions need be performed in every implementation. The resources behind this layer are preferably CDN platform resources, with the VAA layer fronting access to platform machines. For example, a CDN typically provides tools for provisioning and configuring the CDN platform that enable a CDN user to provision and configure CDN features/services for their websites, web applications, and other digital properties being delivered on their behalf over the CDN. A CDN also might offer shared storage resources (e.g., NetStorage), shared computing resources (e.g., multi-tenant shared computing), and other shared infrastructure and services. Note that a CDN user in this context might be a direct CDN customer, a cloud-provider, or a cloud-provider's customer. In these cases, the CDN itself will often define the content policies and other dynamic control information for use in managing access to resources it provides, rather than the CDN user defining a content policy for, e.g., delivery of its content over the CDN.

When a CDN user wants to make a request to such resources, the VAA layer in a given CDN server 302 can perform request validation, authentication, and authorization on the given request before transmitting it to the appropriate machine within the platform that will actually fulfill the request for the resource, e.g., by returning a requested object, a requested result of a particular command, etc. Typically the resource is accessed using a client application that makes requests to an application programming interface (API) for accessing the given resource that has been made available by the CDN to the CDN user. The machine that actually provides the resource in response to the API calls is referred to herein as the API origin server or API origin.

As one skilled in the art will understand, an API often acts as a wrapper around a service, database, or system, made by one team of programmers for another team. In a general sense, an API is often realized as a documented set of calls that come with a definition on how they will behave, and usually, the data they will return. In the context of the web, an API often comprises a pattern of HTTP requests understood at a certain domain or URL path that will act inside the recipient system and with connected systems, and return information back out to the web client, or take an action and report a result back to the client. Data is often passed into a web API using GET and POST or other HTTP calls, and returned from the web API using XML or JSON, other open formats, or proprietary formats. Of course, APIs outside of the HTTP context are also possible.

Thus, for example, assume a given CDN user wants to provision and/or configure some feature of the CDN that affects, e.g. the delivery of content on its website, web application or other digital property. The CDN user can utilize a client application to transmit an API request to the appropriate API endpoint (e.g., available at a particular URL). Via known DNS aliasing techniques (e.g., CNAME and mapping techniques), the client application can be directed to send the request to a particular CDN server 302. The client API request can be received at the edge by the CDN server 302, and VAA layer functions can be performed to create a verified forward request from the CDN server 302 to the appropriate API origin. The API origin is then relieved of the functions already performed by the VAA layer.

Similarly, if a given CDN user wants to upload, change, or view content on a network storage resource using the CDN's storage API, the CDN user client application can transmit an API request to the appropriate API endpoint for such storage resources. The request can be received at the edge by CDN server 302, where validation, authentication, authorization, and other functions can be performed to create a verified forward request from the CDN server 302 to the storage platform, or more specifically, to the storage platform's API origin.

Likewise, if a given CDN customer wants to send data to an application hosted by the computing platform provided by the CDN, the request can be received at the CDN server 302, and authentication, authorization, validation, and other functions can be performed to create a verified forward request from the CDN server 302 to the computing platform's API origin.

The above are merely selected examples.

Figure 9:
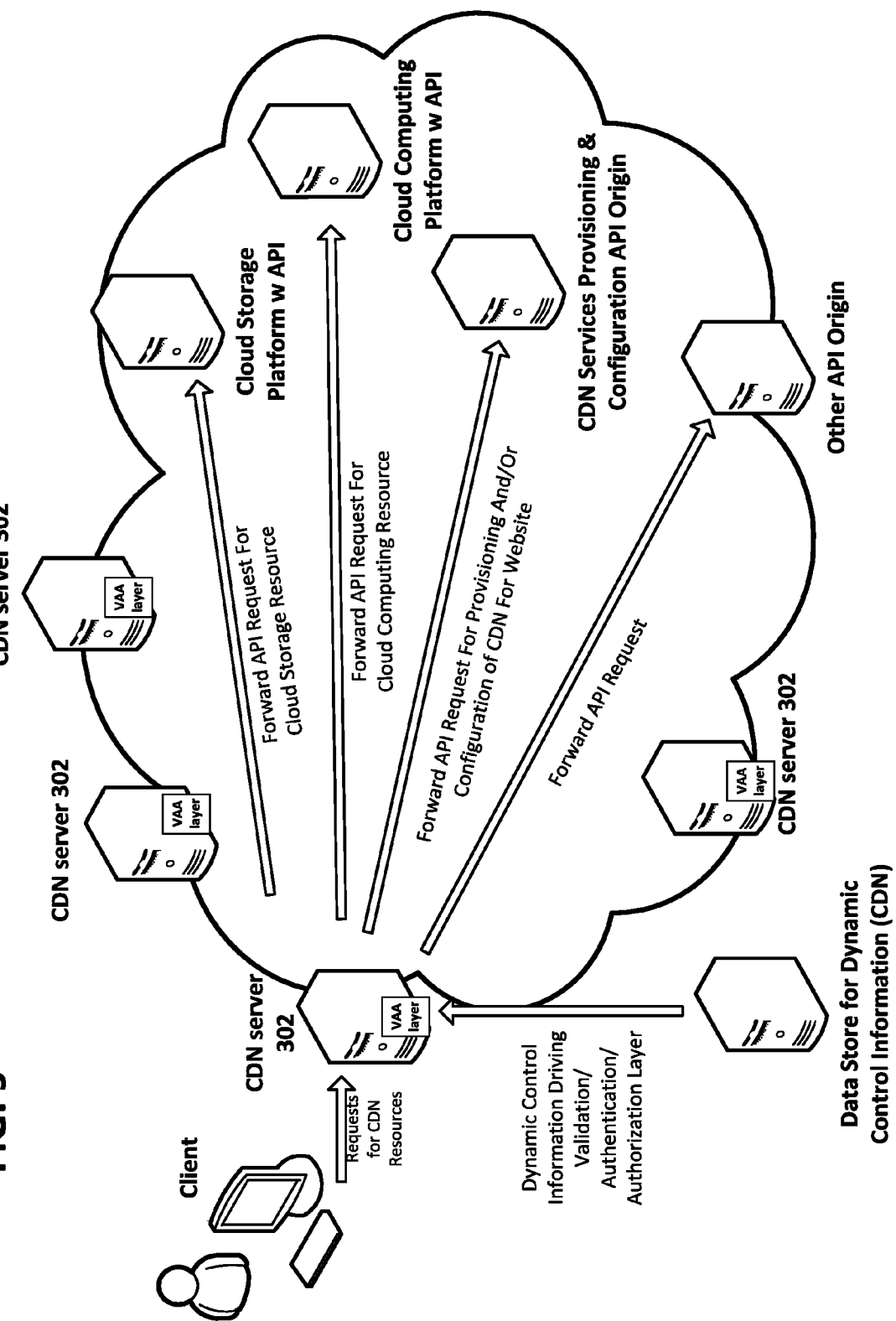
FIG. 9 is a schematic diagram illustrating an embodiment of a distributed request processing layer for validation, authentication, and/or authorization at a network edge.

FIG. 9 illustrates the above scenarios with a given CDN server 302 in the distributed platform.

In one embodiment, the VAA layer described above can be implemented in a CDN server 302 by using information in a metadata file 302a to define certain information that may not be changed often, or for which there are not a high number of possible values. Examples might include a list of API endpoints (e.g., URLs) recognized at the machine, how to forward the request and the like. Dynamic control information can be used to supply, at request time, information that is desired to be highly dynamic, more easily changeable or rotatable, and/or of high cardinality. Such kinds of data might include credentials for a given client application, the resource model for a given API endpoint, authentication and/or authorization secrets needed to for authentication/authorization algorithms, access policies for client applications, and the like; more examples will be described below. It should be understood that no particular functional allocation or apportionment between the slowly-changing/periodically-updated control information in the configuration file and the dynamic control information is required or contemplated, as the allocation of particular functions to one or the other will vary with the design requirements and implementation.

The use of dynamic control information for a VAA-type functions can be advantageous in that, among other things, the dynamic control information 302b can be changed easily (e.g., periodically rotating secrets or changing access policies), and such information does not need to reside on every CDN server 302 but rather only where needed since it will be cached based on pull-based approach, offering a scalable front end to CDN services, thus providing a scalable architecture. The VAA layer also provides offload for the underlying API origins, and a measure of attack protection (e.g., against DDOS attacks).

By way of further illustration, in one embodiment, a given request to an API can be evaluated in a given CDN server 302 in stages, using various components:

Endpoint Validator: validates the request against the endpoints and their resource models;
Request Authenticator: authenticates the client credentials and the signed request messages;
Authorization Enforcer: enforces that the request has the required authorization;
Request Decoration: adds headers to request for use in forwarding and processing by the target API;
Content Policy Agent: fetches the dynamic control information (e.g., in the form of a content policy).

At each stage, the content policy agent can fetch dynamic control information to apply (or can obtain locally cached versions thereof, if not stale). The content policy agent can fetch on the basis of a reference to the components above in a metadata configuration file and based on a content realm ID that is extracted from the client request or based on other information available to the CDN server 302 at the time of processing the API request. For example, for a given client application associated with a particular CDN user, a different set of policies might apply for each type of service that they try to use. Thus, the client's call to an API at user1.purge.cdn.com/foo can be treated differently than user1.upload.cdn.com/foo. This is merely an example.

Figure 10:
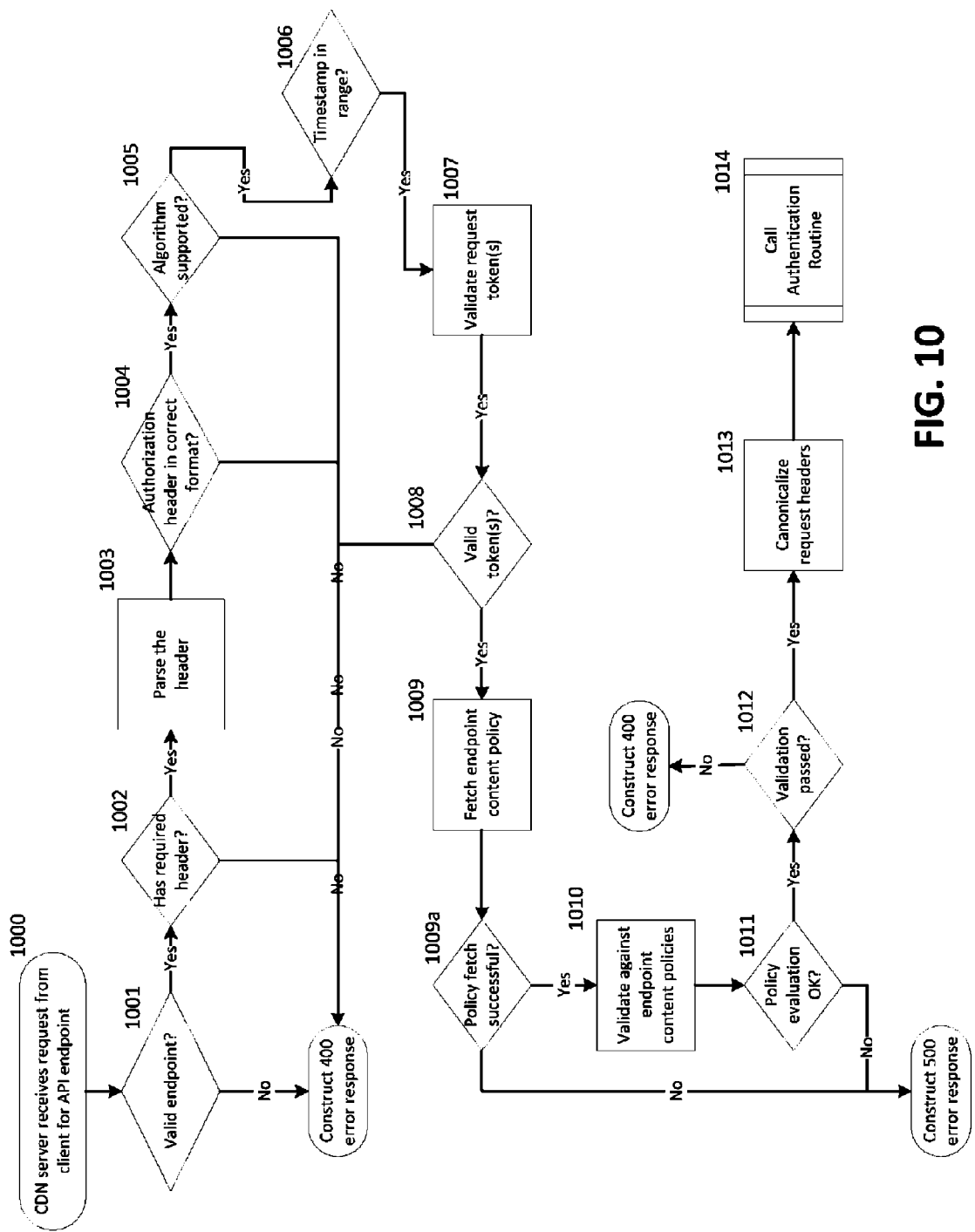
FIG. 10 is a diagram illustrating an embodiment of a logical flow in a CDN server related to the request processing layer of FIG. 9.

Turning to the particular routines in more detail, FIG. 10 is an illustration of a request validation process, in one embodiment. In this stage, the CDN server 302 can parse the client request, checking that the request has the form and substance to constitute a valid request to a valid API endpoint, and that the request is seeking to interact with the API in a way that will be allowed and recognized by the API. Note that while not limiting, FIGS. 10-12 follow HTTP conventions, so error codes are intended to refer to HTTP error codes, headers refer to HTTP headers, etc.

In the flow illustrated in FIG. 10, the CDN server 302 receives a client request directed to a particular API endpoint or service. (Box 1000) The server can perform a variety of general checks, such as whether the endpoint is a valid endpoint, whether the request has necessary headers or other information, and whether it has supported/correct signing algorithms, and has a valid timestamp to prevent replay attacks. (1001-1006) It also can check tokens in the request, to ensure they are in a proper format and have not been tampered with. (1007-1008) Examples of tokens in a request include tokens corresponding to a user, a client application, user group, and/or access to a particular set of services.

In box 1009/1009a of FIG. 10, the CDN server 302 fetches dynamic control information 302b, preferably in the form of a content policy. The policy fetched in 1009/1009a is referred to as an API 'endpoint content policy.' The content realm ID used to fetch this content policy might be a variety of things—as the approach is flexible—but by way of illustration, the content realm ID in this situation might be the particular API endpoint that was requested (e.g., the domain and/or possibly other component of the requested URL). The API endpoint content policy can provide such information such as: the resource model for the particular API endpoint, including what request methods are supported by the requested API, whether the requested resource is valid (e.g., whether the particular URL path and query parameters are valid); what other arguments/parameters/data might be needed and whether they are present in the request; certain parameters and limits, such as maximum size of a POST body that may have been specified for this user; as well as what are supported HTTP methods.

Preferably, the API endpoint content policy contains algorithms to compare the model to the contents of the pending request. In other words, the API endpoint content policy can be executed to determine whether the given client request conforms to what the API origin will expect. (1010) In FIG. 10, the endpoint content policy is executed, and if the request is determined to be valid, the validation routine canonicalizes request headers and calls a client authentication routine. (1011-1014)

Figure 11:
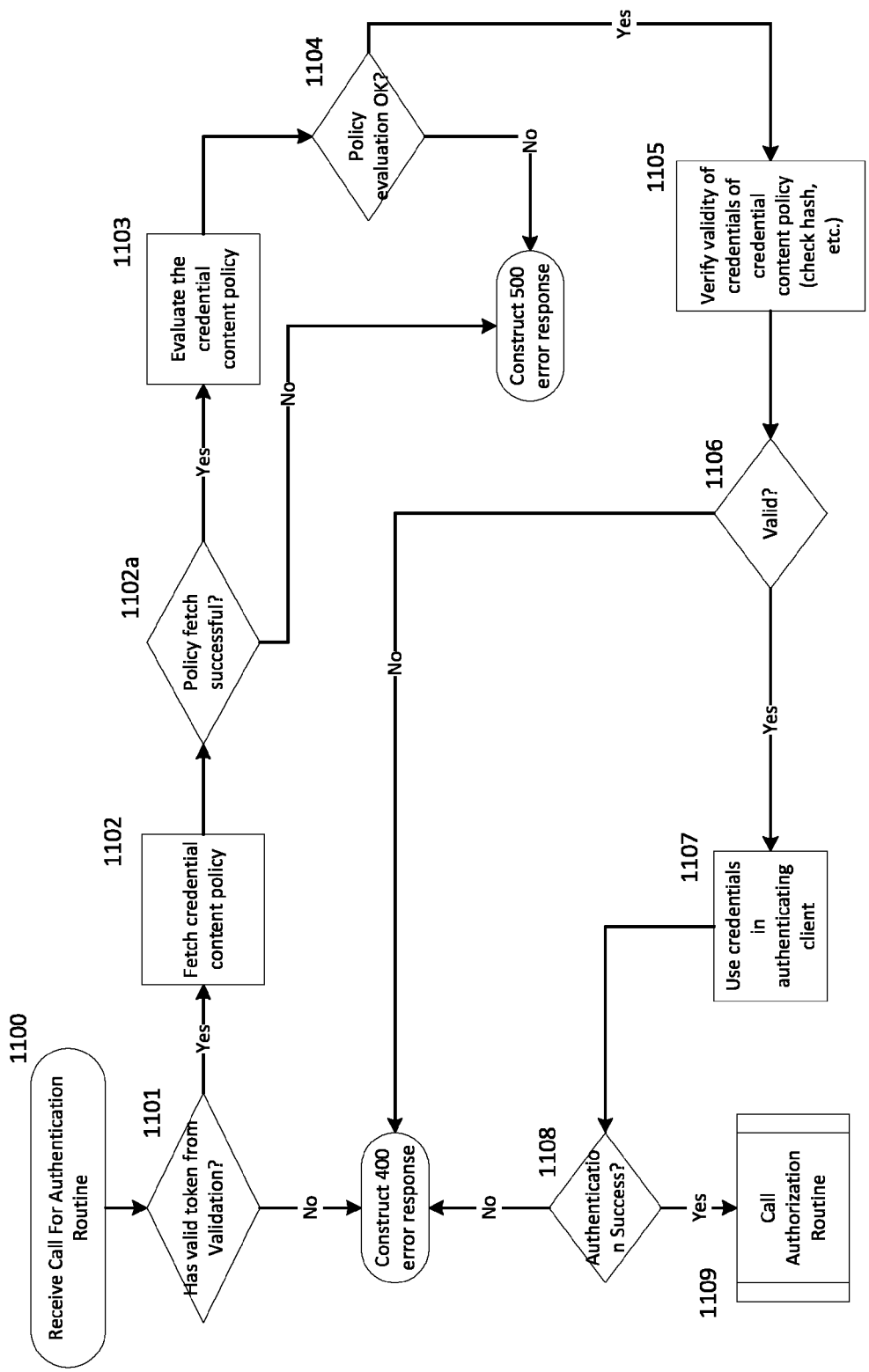
FIG. 11 is a diagram illustrating an embodiment of a logical flow in a CDN server related to the request processing layer of FIG. 9.

FIG. 11 is an illustration of a client authentication routine, in one embodiment. This routine begins when the authentication routine is called at 1100. Preferably, the routine ensures that the client request has a valid token that was appended at the end of the validation routine in FIG. 10, so as to provide a check that the request has come from the validation routine. (1101) If so, the authentication routine pulls the content policy for the authentication routine, which is referred to as a 'credential content policy' in FIG. 11.

(1102-1102a) The content realm ID for fetching the credential content policy might be defined by a value in the client token that was presented by the client, an identifier that uniquely identifies a client credential, subordinating to a client collection. The credential content policy can include an identifier of the client, which can be invariant to client credential rotations, other data invariant to client credential rotations, encrypted secrets corresponding to the particular client, and the like, and other data used for a desired authentication routine. The credential content policy can also contain algorithms for performing authentication checks.

The CDN server 302 can use the credentials provided by the credential content policy to authenticate the client request. (1103-1108) As one skilled in the art will appreciate, a variety of authentication mechanisms and approaches can be employed using the credentials. The ability of the CDN server to fetch and have, at authentication time, a set of credentials for the given client as defined in the dynamically obtained credential content policy, means that it can perform a variety of checks using narrowly-scoped credentials for use in client request decryption, client request signature calculation and verification, and/or other processes as part of authentication.

Note that the client credential policy can also contain instructions for the CDN server 302 to make authentication dependent on some other piece of data available to the server at client request time, such as a client IP address, geography, cookie, etc. Hence, a client IP address that is not on a whitelist (which is provided by the content policy) can result in an overriding determination that the client is not authentic. The client credential policy can leverage a client IP reputation module in the CDN server 302, instructing the CDN server 302 to obtain the reputation score of the particular client IP address and to make an overriding authentication determination based on the returned score. This is merely an example to illustrate the flexibility and power of using dynamic control information 302b (in this case in the form of a credential content policy) for authentication. The authorization routine may be called at 1109 upon completion of authentication.

Figure 12:
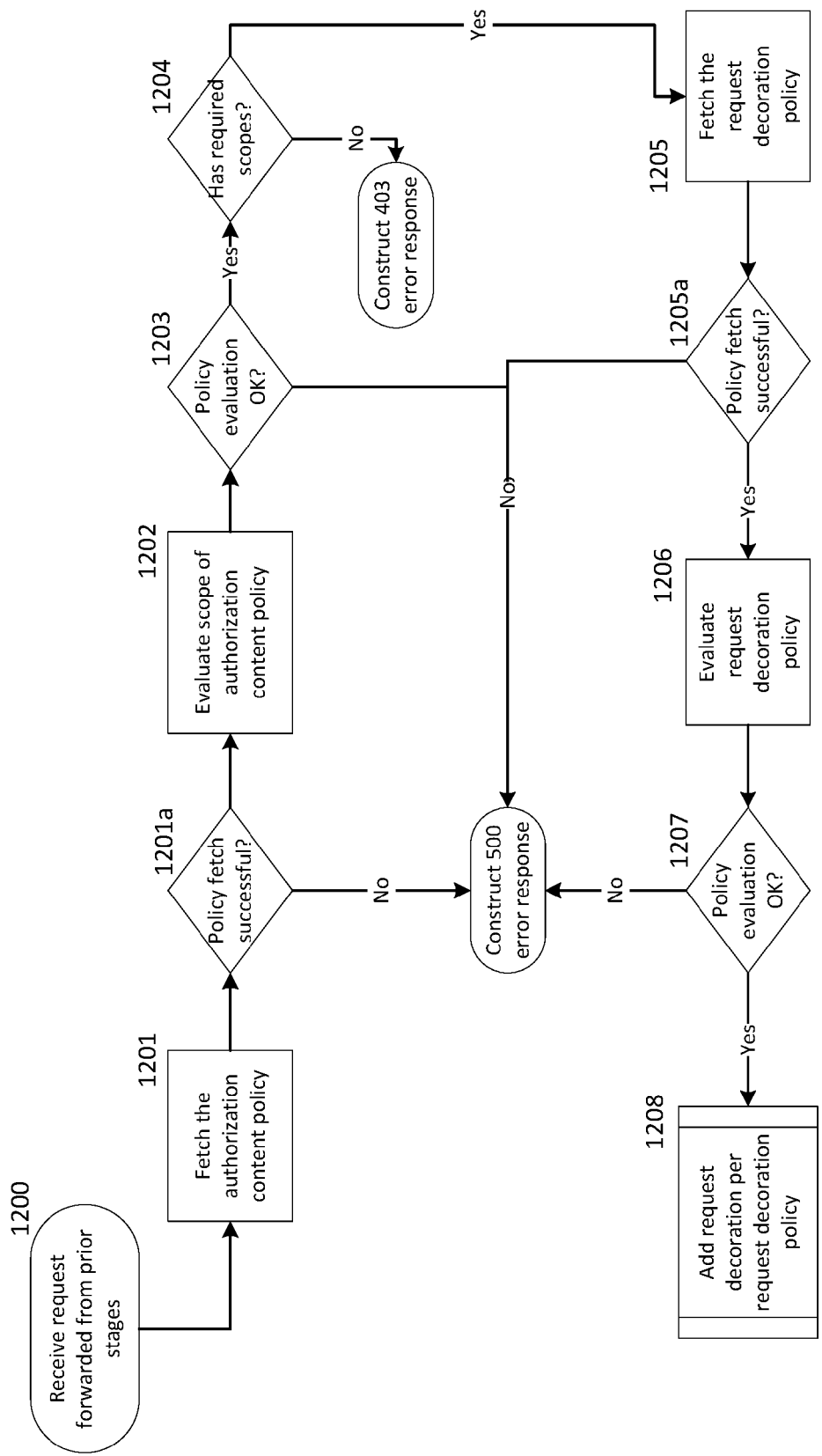
FIG. 12 is a diagram illustrating an embodiment of a logical flow in a CDN server related to the request processing layer of FIG. 9.

FIG. 12 is an illustration of a request authorization routine, in one embodiment. This authorization routine is invoked following the validation and authentication routines, although it should be noted that the order of processing both amongst and within routines described here is intended to illustrate a particular implementation and not meant to be limiting.

The authorization routine begins at box 1200, when the client request is forwarded from the authentication routine. The authorization routine retrieves an authorization content policy from one of many at a remote host. (1201-1201a) An example of a content realm ID for retrieving the authorization routine might be, for example, the value of a client access token that was provided in the request. Data obtained in prior routines (e.g., data in the fetched endpoint and client credential content policies) might also be used and/or combined with information from the request to define a content realm ID. The authorization content policy preferably determines whether the particular client is allowed the access to a resource that it is implicitly asking for with its request. The authorization content policy could contain logic to return, for example, a Boolean value indicating whether access is allowed. As mentioned with respect to the client credential policy, the authorization content policy can be used to enforce authorization policies dependent on a variety of data available to the CDN server 302 fielding the client request. For example, such data might include: request token, client IP, API endpoint, request method and request parameters, geography (e.g., derived from client IP address), time of day, request method, cookie value, and the like. Those can be used to make authorization decisions, as set forth by logic in the dynamically-obtained content policy. As a result, the authorization content policy can be used to enforce different authorization scope on a CDN user by user basis, on the basis of roles within a CDN user's organization, on the basis of particular client applications, and so on.

Returning to FIG. 12, following a determination that the client has the required scope to make the client request (1202-1204), a request decoration routine can be invoked. (1205-1207) Request decoration can involve adding headers or other information to the client request prior to sending it to the API origin. As with other processing, request decoration can be driven by dynamic control information which in FIG. 12 is in the form of a request decoration policy. This policy can provide data and/or logic that instructs the CDN server 302 how to decorate a client request before forwarding it to a particular API origin in the CDN platform. For example, the decoration policy can supply appropriate headers to add to the request (e.g., given the particular API endpoint and particular data from the request), and/or can append additional identity information as to who is requesting service, information about the CDN server 302 that processed the client request for tracking or auditing purposes and so on. The request can also be decorated with signatures from the CDN server 302 to indicate successful validation, authentication, and/or authorization, so that this signature can be verified later by the API origin.

After the request decoration processing is finished (1208), the decorated client request can be sent to the API origin, as was illustrated previously in FIG. 9. The CDN server 302 may encapsulate the client request and send it to the API origin in a message using a separately encrypted and authenticated channel dedicated to CDN server and API origin communication. The CDN server can look up the appropriate API origin for the API endpoint. The result of this lookup may yield a DNS hostname for the API origin, which the CDN server 302 can then look up in the DNS system to determine a particular API origin machine to which to send the request.

While the description above has focused on accessing CDN provided resources through a CDN server enabled with dynamic control information, it should be appreciated that in other embodiments the same techniques can be used to provide a distributed VAA layer as a service for CDN customers. The CDN can provide a set of CDN servers 302 with an VAA layer driven by customer-defined content policies, and the API origin can be the customer's own origin server (e.g., a public-facing website or alternatively part of their enterprise infrastructure). The customer origin server may still perform its own additional validation/authentication/authorization, if desired, but the CDN servers 302 can provide a distributed front-end that provides offload and a measure of security and protection from attack (e.g., distribute denial of service attacks). The customer origin servers can then be configured to accept API requests only from CDN servers providing the VAA layer, using the teachings of U.S. Pat. No. 7,260,639, titled "Method and system for protecting web sites from public internet threats", the teachings of which are incorporated by reference in their entirety.

Usage Based Billing

The complexity of the logic that can be expressed with content policies and other forms of dynamic control information may vary widely across CDN users. Thus, in some embodiments, the CDN can charge customers based on the complexity of the policy that they wish to have the CDN server 302 enforce. In other words, the computing 'cost' of the control information for a given user is the basis for billing on the CDN platform.

Preferably, the unit of measure for cost is central processing unit (CPU) cycles, so as to reflect the complexity of the instruction that the CPU must execute with the data that on which it is performing the instruction, and to reflect the cost in a way independent of the clock frequency at which the processor is running. Preferably, the CDN server 302 logs a transaction along with the CPU cycles associated with evaluating content policies. In the examples above, a policy will generally invoke a <match:content-policy> tag which in turn evaluates rule selectors which in turn evaluate traffic category conditions. The CPU cycles spent on the thread executing the match tag is recorded and aggregated. This can then be used for billing purposes.

Tracking the number of CPU cycles spent executing the policy also has another purpose: to determine if the policy is taking too many computing resources as evidenced by exceeding a pre-defined and configurable CPU cycle maximum limit. Policies that exceed the limit can be aborted for CDN server 302 safety purposes.

Preferably, the cost of determining the CPU cycles spent evaluating a particular policy is performed in a cheap way—from a computing perspective—so that it does not significantly interfere with or affect the traffic-related duties of the CDN server 302. Further, preferably the computation of the CPU cycle metric is generally consistent on the same machine/OS, or capable of being normalized across disparate environments.

In one embodiment, CPU cycles can be measured by reading a CPU cycle count register, which provides a cycle count for a given CPU. On x86 and Intel processors this register is called the Time Stamp Counter (TSC) register. Other kinds of processors provide registers that can be used similarly. The TSC is 64-bit register. It is read using the 'rdtsc' instruction. The 'rdtsc' instruction returns, in about eight nanoseconds, the number of CPU cycles elapsed, however the value is specific to the CPU and not to the executing user thread, so execution in other threads artificially inflate the value.

When applying a policy at the CDN server 302, the operation is preferably performed in a serialized manner on one of the CPUs. While performing the operation, a CPU cycle count reading from TSC is taken before, during, and after the execution of the policy. Frequent readings of TSC are taken during the application of the rule expressions and condition evaluations, and these readings are accumulated. In one implementation, for example, a reading is taken about every ten condition evaluations.

By taking frequent readings it becomes easier to implement a strategy of enforcing a maximum CPU cycle limit for policy application. It also becomes easier to identify and/or remove outlier CPU readings caused by infrequent thread context switches that are not easily eliminated when running software in user space. For example, the frequency of the readings enables one to detect large spikes caused by a thread context switch and filter them out.

The result is a more accurate measure of computational effort in a heterogenous environment that allows for usage based billing and that facilitates the enforcement of limits on policy computations in order to provide service quality guarantees across CDN users. The CDN service provider can define such limits in order to manage its platform, and prevent execution of a particular content policy from excessively consuming a CDN server's resources.

Even if read frequently, however, the TSC may not be sufficiently accurate because of the off-thread execution problem identified above. Hence, another embodiment for measuring the number of CPU cycles m reading the TSC register as above, and adapting the operating system kernel to identify and capture the CPU cycle count when a context switch occurs. The kernel can make these count markers available to the process that is calculating the CPU cost, so that the inapplicable (off-thread) CPU cycles can be eliminated (deducted) from the TSC count, reducing the error associated with context switches.

Yet another embodiment for measuring CPU cycles involves using a combination of counters. In this embodiment, the counters are the Time Stamp Counter (TSC), described above, and a Performance Counter for Linux (PCL), which is a monitoring interface available for the Linux kernel (e.g., in versions 2.6.31 and later). PCL supports a method of getting per-thread CPU cycle measurements using a kernel API. Using PCL involves opening an instance to the API for the thread of interest (the thread executing the content policy), calling RESET and ENABLE, and then periodically taking readings with a system read call. Reading TSC involves less computing cost that reading PCL, but PCL can be more accurate because it is specific to a given thread, whereas the TSC is not and therefore can give an artificially high reading, as noted previously.

Figure 13:
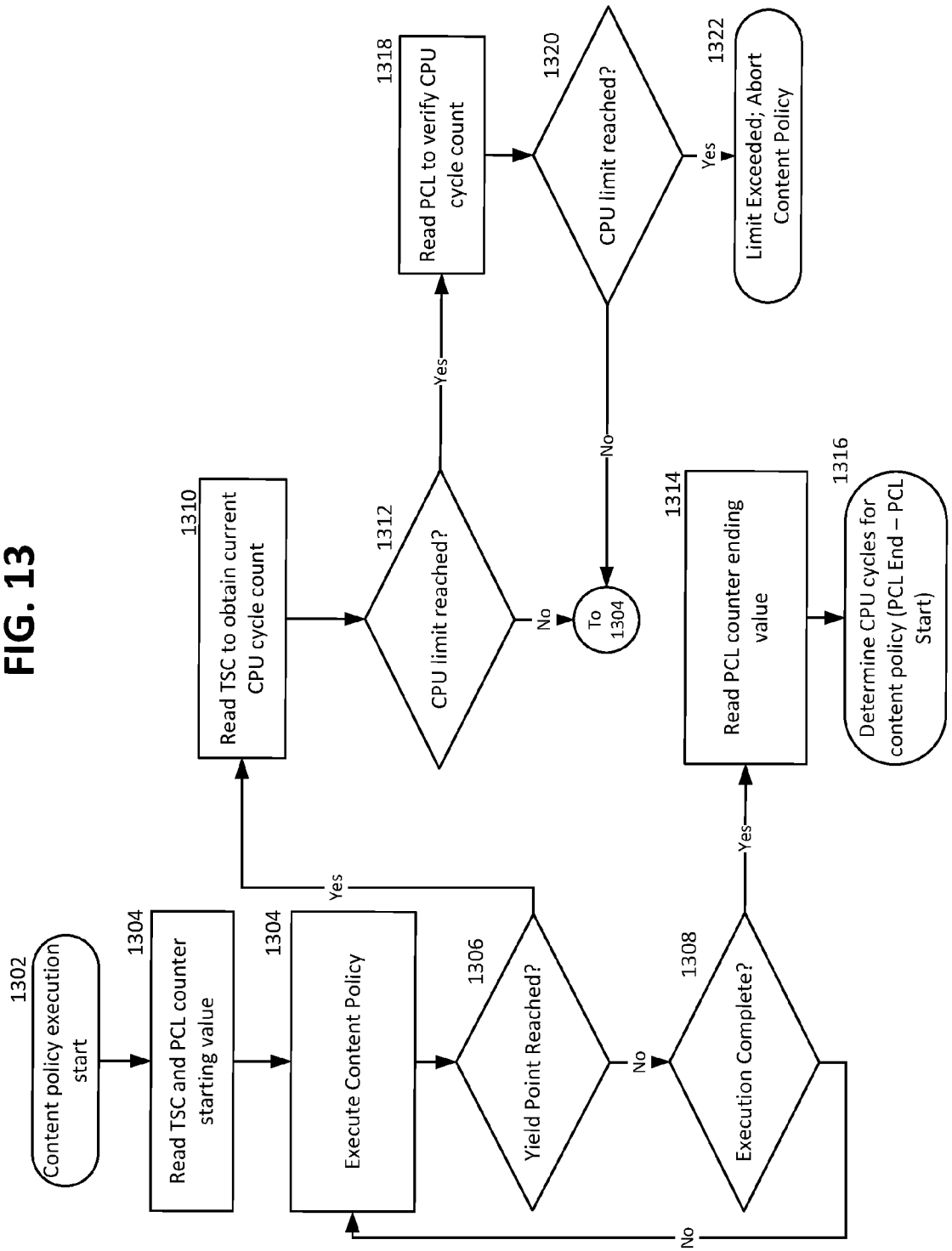
FIG. 13 is a diagram illustrating an embodiment of a logical flow in a CDN server; and, FIG. 14 is a block diagram illustrating hardware in a computer system that may be used to implement the teachings hereof.

FIG. 13 is a flow chart illustrating an embodiment using both TSC and PCL. The execution of a given policy begins at 1302, and the TSC and PCL registers are both read to establish a start value for each at 1304. When the process reaches given yield points in the loops executing the policy match taxonomy categories, conditions, and other logic (1306), the TSC is read to determine the current CPU cycle count (1310). If at 1312 the TSC's CPU cycle count (TSC Current minus TSC Start) shows we have exceeded a configured maximum allowed CPU cycle number, then we further validate the reading by reading PCL (1318). If the PCL's CPU cycle count (PCL Current minus PCL Start) shows that the limit has not been exceeded, then execution can continue at 1304. But if PCL also shows that the maximum has been exceeded, then we abort the content policy match execution (1320 and 1322). This way in the common case we only read TSC, which is efficient. If a context switch occurs and the TSC reading becomes much larger than expected, validating with PCL will give a definitive answer.

Assuming the CPU cycle limit is not reached, eventually the execution of the policy finishes normally. The PCL is read at the end to accurately calculate total CPU cycles spent on execution of the content policy match (PLC End minus PLC Start). (1314 and 1316.) This number is used for logging and billing purposes.

Preferably, in addition to logging the CPU cycle count, the CDN server 302 also logs the machine type to provide a better context of how the CPU count value relates to time spent (e.g., the MHz/GHz rating and CPU number/type of the machine, and potentially other hardware characteristics). Given the CPU cycle count and these metrics, the actual processing time spent can be calculated.

It should be noted that other techniques for determining computing cost can be used in certain implementations, depending on design goals and billing approaches. For example, the clock_gettime( ) and gettimeofday( ) functions are also available, although these generally consume more CPU time than for instance the rdstc register technique.

Further, it should be noted that other approaches may be used to charge for the execution of the dynamic control information, such as measuring the size of the control information retrieved (policy size), the number of conditional or other statements (policy complexity), and/or measuring the amount of traffic between the CDN server and the remote host created by fetching the policies (policy traffic).

Computer Based Implementation

The subject matter described herein may be implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 14:
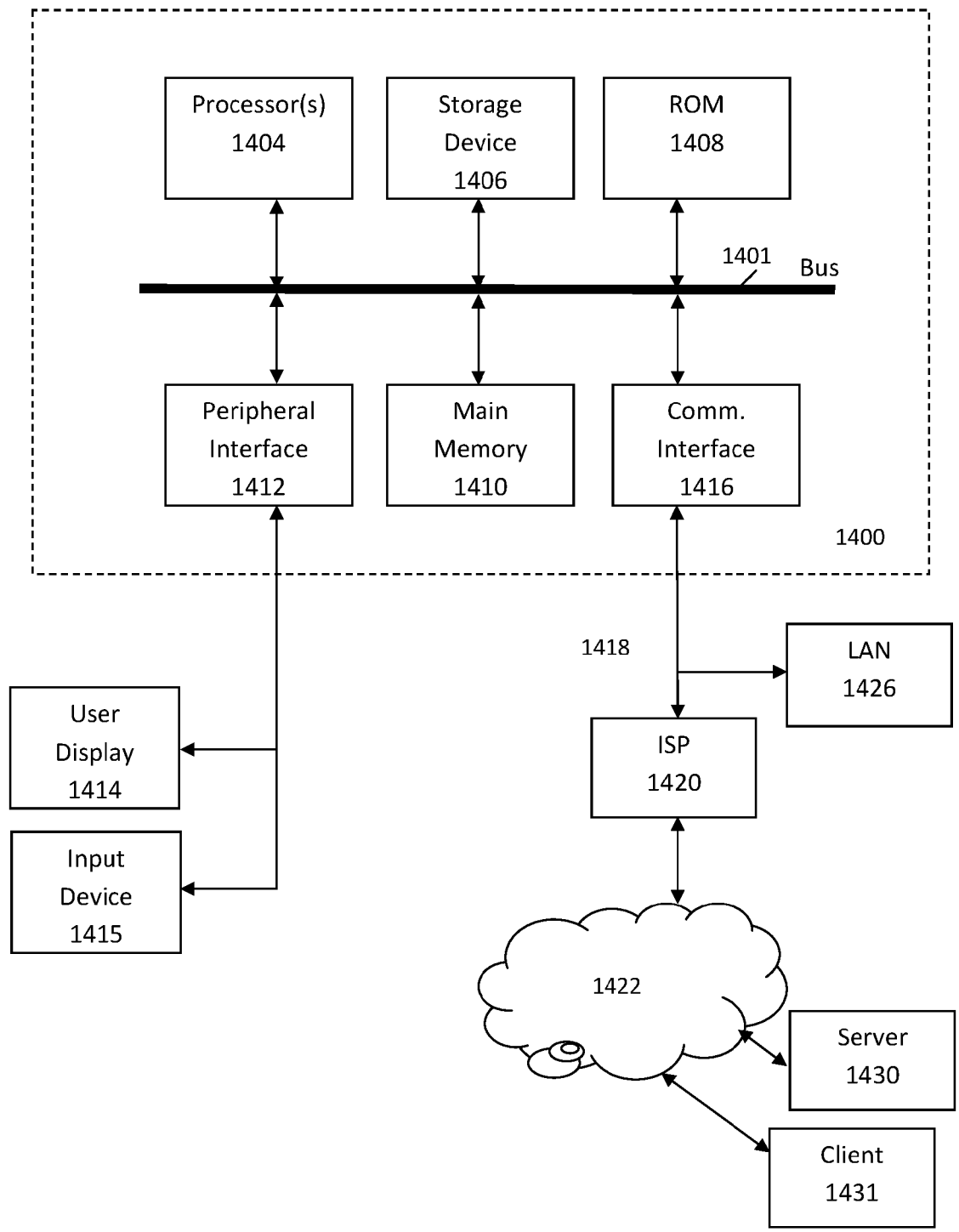

FIG. 14 is a block diagram that illustrates hardware in a computer system 1400 on which embodiments of the invention may be implemented. The computer system 1400 may be embodied in a client device, server, personal computer, workstation, tablet computer, wireless device, mobile device, network device, router, hub, gateway, or other device.

Computer system 1400 includes a processor 1404 coupled to bus 1401. In some systems, multiple microprocessor and/or microprocessor cores may be employed. Computer system 1400 further includes a main memory 1410, such as a random access memory (RAM) or other storage device, coupled to the bus 1401 for storing information and instructions to be executed by processor 1404. A read only memory (ROM) 1408 is coupled to the bus 1401 for storing information and instructions for processor 1404. A non-volatile storage device 1406, such as a magnetic disk, solid state memory (e.g., flash memory), or optical disk, is provided and coupled to bus 1401 for storing information and instructions. Other application-specific integrated circuits (ASICs), field programmable gate arrays (FPGAs) or circuitry may be included in the computer system 1400 to perform functions described herein.

Although the computer system 1400 is often managed remotely via a communication interface 1416, for local administration purposes the system 1400 may have a peripheral interface 1412 communicatively couples computer system 1400 to a user display 1414 that displays the output of software executing on the computer system, and an input device 1415 (e.g., a keyboard, mouse, trackpad, touchscreen) that communicates user input and instructions to the computer system 1400. The peripheral interface 1412 may include interface circuitry and logic for local buses such as Universal Serial Bus (USB) or other communication links.

Computer system 1400 is coupled to a communication interface 1416 that provides a link between the system bus 1401 and an external communication link. The communication interface 1416 provides a network link 1418. The communication interface 1416 may represent an Ethernet or other network interface card (NIC), a wireless interface, modem, an optical interface, or other kind of input/output interface.

Network link 1418 provides data communication through one or more networks to other devices. Such devices include other computer systems that are part of a local area network (LAN) 1426. Furthermore, the network link 1418 provides a link, via an internet service provider (ISP) 1420, to the Internet 1422. In turn, the Internet 1422 may provide a link to other computing systems such as a remote server 1430 and/or a remote client 1431. Network link 1418 and such networks may transmit data using packet-switched, circuit-switched, or other data-transmission approaches.

In operation, the computer system 1400 may implement the functionality described herein as a result of the processor executing code. Such code may be read from or stored on a non-transitory computer-readable medium, such as memory 1410, ROM 1408, or storage device 1406. Other forms of non-transitory computer-readable media include disks, tapes, magnetic media, CD-ROMs, optical media, RAM, PROM, EPROM, and EEPROM. Any other non-transitory computer-readable medium may be employed. Executable code may also be read from network link 1418 (e.g., following storage in an interface buffer, local memory, or other circuitry).

The invention claimed is:

1. A system, comprising:
   a first server managed by a content delivery network (CDN) service provider and comprising circuitry forming one or more processors coupled to memory holding non-transitory computer-program instructions to be executed by the one or more processors to cause the first server to:
   receive a first request from a client device over a network interface, the first request comprising an application programming interface (API) request;
   in response to the first request, determine a configuration file stored at the first server to apply for handling the first request;
   identify, within the configuration file, a content control that indicates how to handle the first request from within a set of content controls stored at the first server in the configuration file;
   wherein the content control has a reference to an API endpoint content policy that controls, at least, client authorization;
   extract an identifier from the first request received from the client, the extracted identifier comprising at least a portion of the first request;
   in response to the identification of the content control with the reference to the API endpoint content policy, send a second request that includes the extracted identifier to a remote host for the API endpoint content policy;

receive the API endpoint content policy from the remote host in response to the second request, the API endpoint content policy calling a routine for authorizing any of the client device, client user, and client application;

apply the content control to the request at least by applying the API endpoint content policy and the routine to determine whether any of the client device, client user, and client application, is authorized to access a resource associated with the first request;

based at least in part on applying the content control and the API endpoint content policy and successfully authorizing any of the client device, client user, and client application for the access to the resource associated with the first request, send at least a portion of the first request to a second server, the second server being an API origin for the API;

the remote host comprising circuitry forming one or more processors coupled to memory holding non-transitory computer-program instructions to be executed by the one or more processors to cause the remote host to:

receive the second request from the first server, with the extracted identifier;

based at least in part on the extracted identifier, select the API endpoint content policy from amongst a plurality of API endpoint content policies stored at the remote host;

send the API endpoint content policy to the first server, in response to the second request;

wherein the first server is one of a plurality of distributed CDN servers, the first request is for a service accessible via the API, and the service enables any of: (i) interaction with a multi-tenant storage system operated by the CDN service provider on behalf of content providers, (ii) interaction with a multi-tenant computing system operated by the CDN service provider on behalf of content providers, and (iii) configuration by a CDN user of a CDN content delivery service, said configuration comprising configuration of CDN features and services for delivering any of a website and a web application on the CDN user's behalf over the CDN.

2. The system of claim 1, wherein the first request is directed to universal resource identifier (URI) that represents an API endpoint, the URI comprising any of a hostname and a path.

3. The system of claim 1, wherein the API endpoint content policy comprises any of a client identifier and data used for an authentication routine.

4. The system of claim 1, wherein the API endpoint content policy comprises logic for validating the first request.

5. The system of claim 1, wherein the first server is one of a plurality of distributed CDN servers, the first request is for a service accessible via the API, and the service comprises a service provided by the CDN.

6. The system of claim 1, wherein the first server is one of a plurality of distributed CDN servers, the first request is for a service accessible via the API, and the service enables interaction with any of: (i) a multi-tenant storage system operated by the CDN on behalf of content providers, and (ii) a multi-tenant computing system operated by the CDN on behalf of content providers.

7. The system of claim 1, wherein the first server is one of a plurality of distributed CDN servers, the first request is for a service accessible via the API, and the service enables configuration by a CDN user of a CDN content delivery service, said configuration comprising configuration of CDN features and services for delivering any of a website and a web application being delivered on the CDN user's behalf over the CDN.

8. A method, comprising:

with at least one first server:

receiving a first request from a client device over a network interface, the first request comprising an application programming interface (API) request;

in response to the first request, determining a configuration file stored at the at least one first server to apply for handling the first request;

identifying, within the configuration file, a content control that indicates how to handle the first request from within a set of content controls stored at the at least one first server in the configuration file;

wherein the content control has a reference to an API endpoint content policy that controls, at least, client authorization;

extracting an identifier from the first request received from the client, the extracted identifier comprising at least a portion of the first request;

in response to the identification of the content control with the reference to the API endpoint content policy, sending a second request that includes the extracted identifier to at least one remote host for the API endpoint content policy;

receiving the API endpoint content policy from the at least one remote host in response to the second request, the API endpoint content policy calling a routine for authorizing any of the client device, client user, and client application;

applying the content control to the request at least by applying the API endpoint content policy and the routine to determine whether any of the client device, client user, and client application, is authorized to access a resource associated with the first request;

based at least in part on applying the content control and the API endpoint content policy and successfully authorizing any of the client device, client user, and client application for the access to the resource associated with the first request, sending at least a portion of the first request to a second server, the second server being an API origin for the API;

with the at least one remote host:

receiving the second request from the at least one first server, with the extracted identifier;

based at least in part on the extracted identifier, selecting the API endpoint content policy from amongst a plurality of API endpoint content policies stored at the at least one remote host;

sending the API endpoint content policy to the at least one first server, in response to the second request;

wherein the at least one first server is one of a plurality of distributed CDN servers, the first request is for a service accessible via the API, and the service enables any of: (i) interaction with a multi-tenant storage system operated by the CDN service provider on behalf of content providers, (ii) interaction with a multi-tenant computing system operated by the CDN service provider on behalf of content providers, and (iii) configuration by a CDN user of a CDN content delivery service, said configuration comprising configuration of CDN features and services for delivering any of a website and a web application on the CDN user's behalf over the CDN.

9. The method of claim 8, wherein the first request is directed to universal resource identifier (URI) that represents an API endpoint, the URI comprising any of a hostname and a path.

10. The method of claim 8, wherein the API endpoint content policy comprises any of a client identifier and data used for an authentication routine.

11. The method of claim 8, wherein the API endpoint content policy comprises logic for validating the first request.

12. The method of claim 8, wherein the at least one first server is one of a plurality of distributed CDN servers, the first request is for a service accessible via the API, and the service comprises a service provided by the CDN.

13. The system of claim 8, wherein the at least one first server is one of a plurality of distributed CDN servers, the first request is for a service accessible via the API, and the service enables interaction with any of: (i) a multi-tenant storage system operated by the CDN on behalf of content providers, and (ii) a multi-tenant computing system operated by the CDN on behalf of content providers.

14. The system of claim 8, wherein the at least one first server is one of a plurality of distributed CDN servers, the first request is for a service accessible via the API, and the service enables configuration by a CDN user of a CDN content delivery service, said configuration comprising configuration of CDN features and services for delivering any of a website and a web application being delivered on the CDN user's behalf over the CDN.

* * * * *